US012561323B2

(12) United States Patent
Kläbe et al.

(10) Patent No.: US 12,561,323 B2
(45) Date of Patent: Feb. 24, 2026

(54) PATCHED MULTI-KEY PARTITIONING FOR ROBUST QUERY PERFORMANCE

(71) Applicant: Actian Corporation, Round Rock, TX (US)

(72) Inventors: Steffen Kläbe, Ilmenau (DE); Stephan Baumann, Ilmenau (DE); Thomas Schweser, Ilmenau (DE)

(73) Assignee: Actian Corporation, Round Rock, TX (US)

( * ) Notice: Subject to any disclaimer, the term of this patent is extended or adjusted under 35 U.S.C. 154(b) by 0 days.

(21) Appl. No.: 18/636,874

(22) Filed: Apr. 16, 2024

(65) Prior Publication Data

US 2024/0346022 A1     Oct. 17, 2024

Related U.S. Application Data

(60) Provisional application No. 63/496,583, filed on Apr. 17, 2023.

(51) Int. Cl.
　G06F 16/2453　　(2019.01)
　G06F 16/22　　(2019.01)
　G06F 16/2452　　(2019.01)

(52) U.S. Cl.
　CPC .... G06F 16/24544 (2019.01); G06F 16/2282 (2019.01); G06F 16/24526 (2019.01)

(58) Field of Classification Search
　USPC ........................................................ 707/714
　See application file for complete search history.

(56) References Cited

U.S. PATENT DOCUMENTS

| | | | | |
|---|---|---|---|---|
| 10,268,735 B1 * | 4/2019 | White | ................. | G06F 16/9024 |
| 2012/0317142 A1 * | 12/2012 | Broecheler | ......... | G06F 16/9024 |
| | | | | 707/E17.011 |
| 2013/0179586 A1 * | 7/2013 | Branson | .................... | G06F 9/44 |
| | | | | 709/231 |
| 2019/0235919 A1 * | 8/2019 | Barsness | ............. | G06F 16/2282 |

(Continued)

OTHER PUBLICATIONS

Abadi, D., et al., "The Design and Implementation of Modern col. Oriented Database Systems", Foundations and Trends in Databases, 2013, pp. 197-280, vol. 5, No. 3, Now Publishers Inc., Hanover, MA, USA (87 pages).

(Continued)

*Primary Examiner* — Muluemebet Gurmu
(74) *Attorney, Agent, or Firm* — ArentFox Schiff LLP

(57) ABSTRACT

Aspects described herein relate to partitioning multiple data tuples stored in a database system to multiple partitions based on multiple partition keys. The multiple data tuples can be assigned to multiple partitions such that each partition of the multiple partitions includes a portion of the multiple data tuples having same values for at least one of the multiple partition keys. A set of exceptions can be generated including data tuples having a first value of at least a first one of the multiple partition keys that is the same as the same value of a first portion of data tuples assigned to a first one of the multiple partitions, and a second value of at least a second one of the multiple partition keys that is the same as the same value of a second portion of data tuples assigned to a second one of the multiple partitions.

20 Claims, 10 Drawing Sheets

(56)                    References Cited

U.S. PATENT DOCUMENTS

2019/0370268 A1*  12/2019  Koochakzadeh ..... G06F 16/211
2021/0406251 A1*  12/2021  Kläbe ................ G06F 16/2379

OTHER PUBLICATIONS

Adoni, H., et al., "A survey of current challenges in partitioning and processing of graph-structured data in parallel and distributed systems", Distributed and Parallel Databases, Jun. 2020, pp. 495-530, Springer Science+Business Media, LLC, https://doi.org/ 10.1007/s10619-019-07276-9 (37 pages).

Alekseev, V.E., et al., "NP-hard graph problems and boundary classes of graphs", Theoretical Computer Science 389, 2007, pp. 219-236, Elsevier B.V. (18 pages).

Babcock, B, et al., "Towards a Robust Query Optimizer: A Principled and Practical Approach", Proceedings of the 2005 ACM SIGMOD International Conference on Management of Data (Baltimore, Mary-land) (SIGMOD '05)., 2005, pp. 119-130, ACM, New York, NY, USA, https://doi.org/10.1145/1066157.1066172 (12 pages).

Baumann, S., et al., "Bitwise dimensional co-clustering for analytical workloads" The VLDB Journal, Jun. 2016, pp. 291-316, Springer-Verlag Berlin Heidelberg 2016, https://doi.org/10.1007/s00778-015-0417-y (27 pages).

Bhattacharjee, B., et al., "Efficient Query Processing for Multi-Dimensionally Clustered Tables in DB2", Proceedings of the 29th International Conference on Very Large Data Bases, 2003, pp. 963-974, vol. 29, VLDB Endowment, Berlin, Germany (12 pages).

Boncz, P.A., et al., "MonetDB/X100: Hyper-Pipelining Query Execution", Second Biennial Conference on Innovative Data Systems Research, CIDR 2005, 2005, pp. 225-237, http://cidrdb.org/cidr2005/papers/P19.pdf (13 pages).

Buluc, A., et al., "Recent Advances in Graph Partitioning", arXiv:1311.3144 [cs, math] (Feb. 2015). http://arxiv.org/abs/1311.3144 (37 pages).

Cramér, Harald. 1946. Mathematical Methods of Statistics. Princeton University Press. https://archive.org/details/in.ernet.dli.2015.223699/page/n17/mode/2up.

Curino, C., et al., "Schism: A Workload-Driven Approach to Database Replication and Partitioning", Proceedings of the VLDB Endowment, 2010, pp. 48-57, vol. 3, Iss. 1, VLDB Endowment, https://doi.org/10.14778/1920841.1920853 (10 pages).

Fan, W., et al., "Incrementalization of Graph Partitioning Algorithms", Proceedings of the VLDB Endowment, 2020, pp. 1261-1274, vol. 13, Iss. 8, VLDB Endowment, https://doi.org/10.14778/3389133.3389142 (14 pages).

Garcia-Alvarado, C., et al., "Automatic Data Placement in MPP Databases", 2012 IEEE 28th International Conference on Data Engineering Workshops, 2012, pp. 322-327, https://doi.org/10.1109/ICDEW.2012.45 (6 pages).

Graefe, G., et al., "Robust Query Processing", Dagstuhl Reports, 2012, pp. 1-15, vol. 2, Iss. 8, Schloss Dagstuhl—Leibniz-Zentrum für Informatik, Germany (15 pages).

Guerrieri, Alessio, "Distributed Computing For Large-Scale Graphs", PHD Thesis, 2015 (141 pages).

Hanai, M., et al., "Distributed Edge Partitioning for Trillion-edge Graphs", Proceedings of the VLDB Endowment, Sep. 2019, pp. 2379-2392, vol. 12, No. 13, VLDB Endowment, https://doi.org/10.14778/3358701.3358706 (14 pages).

Hilprecht, B., et al., "Learning a Partitioning Advisor for Cloud Databases", Proceedings of the 2020 ACM SIGMOD International Conference on Management of Data, pp. 143-157, ACM, Portland, OR, USA, https://doi.org/10.1145/3318464.3389704 (15 pages).

Karpathiotakis, M., et al., "Adaptive Query Processing on RAW Data", Proceedings of the VLDB Endowment, Aug. 2014, pp. 1119-1130, vol. 7, No. 12, VLDB Endowment, https://doi.org/10.14778/2732977.2732986 (12 pages).

Karypis, G., et al., "A Fast and High Quality Multilevel Scheme for Partitioning Irregular Graphs", SIAM Journal on Scientific Computing, 1998, pp. 359-392. vol. 20, No. 1, Society for Industrial and Applied        Mathematics,        https://doi.org/10.1137/S1064SIAM827595287997 (34 pages).

Kläbe, S., et al., "PatchIndex—Exploiting Approximate Constraints in Self-managing Databases", 36th IEEE International Conference on Data Engineering Workshops, 2020, pp. 139-146, IEEE, Dallas, TX, USA, ttps://doi.org/10.1109/ICDEW49219.2020.00014 (8 pages).

Kläbe, S., et al., "Updatable Materi-alization of Approximate Constraints", 37th IEEE International Conference on Data Engineering, ICDE 2021, 2021, pp. 1991-1996, IEEE, Chania, Greece, https://doi.org/10.1109/ICDE51399.2021.00189 (6 pages).

Liming, D., et al., "Coexistence of Multiple Partition Plan Based Physical Database Design", Proceedings of the 5th International Conference on Communications and Broadband Networking, 2017, pp. 41-46, Association for Computing Machinery, New York, NY, USA, https://doi.org/10.1145/3057109.3057111 (6 pages).

Moerkotte, Guido, "Small Materialized Aggregates: A Light Weight Index Structure for Data Warehousing", Proceedings of the 24th VLDB Conference, 1998, pp. 476-487, (12 pages).

Nehme, R., et al., "Automated Partitioning Design in Parallel Database Systems", Proceedings of the 2011 ACM SIGMOD International Conference on Management of Data (SIGMOD '11), pp. 1137-1148, Association for Computing Machinery, New York, NY, USA, https://doi.org/10. 1145/1989323.1989444 (12 page).

Parchas, P., et al., "Fast and Effective Distribution-Key Recommendation for Amazon Redshift", Proceedings of the VLDB Endowment, 2020, pp. 2411-2423, vol. 13, No. 11, VLDB Endowment, http://www.vldb.org/pvldb/vol13/p2411-parchas.pdf (13 pages).

Pavlo, A., et al., "Skew-Aware Auto-matic Database Partitioning in Shared-Nothing, Parallel OLTP Systems", Proceedings of the 2012 ACM SIGMOD International Conference on Management of Data (SIGMOD '12), pp. 61-72, Association for Computing Machinery, New York, NY, USA, https://doi.org/10.1145/2213836.2213844 (12 pages).

Poess, M., et al., "Why You Should Run TPC-DS: A Workload Analysis", Proceedings of the 33rd International Conference on Very Large Data Bases, 2007, pp. 1138-1149, VLDB Endowment, (12 pages).

Rahimian, F., et al., "Distributed Vertex-Cut Partitioning", Distributed Applications and Interoperable Systems, 2014, pp. 186-200, vol. 8460, Springer Berlin Heidelberg, Berlin, Heidelberg, https://doi.org/10. 1007/978-3-662-43352-2_15 (15 pages).

Rahimian, F., et al., "A Distributed Algorithm for Large-Scale Graph Partitioning", ACM Transactions on Autonomous and Adaptive Systems, 2015, pp. 1-24, vol. 10, No. 2, Article 12, https://doi.org/10.1145/2714568 (24 pages).

Stohr, T., et al., "Multi-Dimensional Database Allocation for Parallel Data Warehouses", Proceedings of the 26th International Conference on Very Large Data Bases (VLDB), 2000, pp. 273-284, Morgan Kaufmann Publishers Inc., San Francisco, CA, USA.

Varadarajan, R., et al., "DBDesigner: A customizable physical design tool for Vertica Analytic Database", IEEE 30th International Conference on Data Engineering, Chicago, ICDE 2014, 2014, pp. 1084-1095, IEEE Computer Society, https://doi.org/10.1109/ICDE.2014.6816725 (12 pages).

Vogelsgesang, A., et al., "Get Real: How Benchmarks Fail to Represent the Real World", Proceedings of the 7th International Workshop on Testing Database Systems, Jun. 15, 2018, pp. 1:1-1:6, ACM, Houston, TX, USA, https://doi.org/10.1145/3209950.3209952 (6 pages).

Winslett, M., et al., "Goetz Graefe Speaks Out on (Not Only) Query Optimization", SIGMOD Record, 2020, pp. 30-36, vol. 49, No. 3, https://doi.org/10.1145/3444831.3444837 (7 pages).

Yin, S., et al., "Robust Query Optimization Methods With Respect to Estimation Errors: A Survey", SIGMOD Record, 2015, pp. 25-36, vol. 44, No. 3, https://doi.org/10.1145/2854006.2854012 (12 pages).

Zamanian, E., et al., "Locality-Aware Partitioning in Parallel Database Systems", Proceedings of the 2015 ACM SIGMOD International Conference on Management of Data, 2015, pp. 17-30, Association for Computing Machinery, New York, NY, USA, https://doi.org/10.1145/2723372.2723718 (14 pages).

* cited by examiner

500

| Partition 505a | | Partition 505b |

Network 510

Database System 502

Data Partitioner 520

Graph Partitioner 532

Iterative Partitioner 534

Exception Set 540

Data Store 550

600

700

702

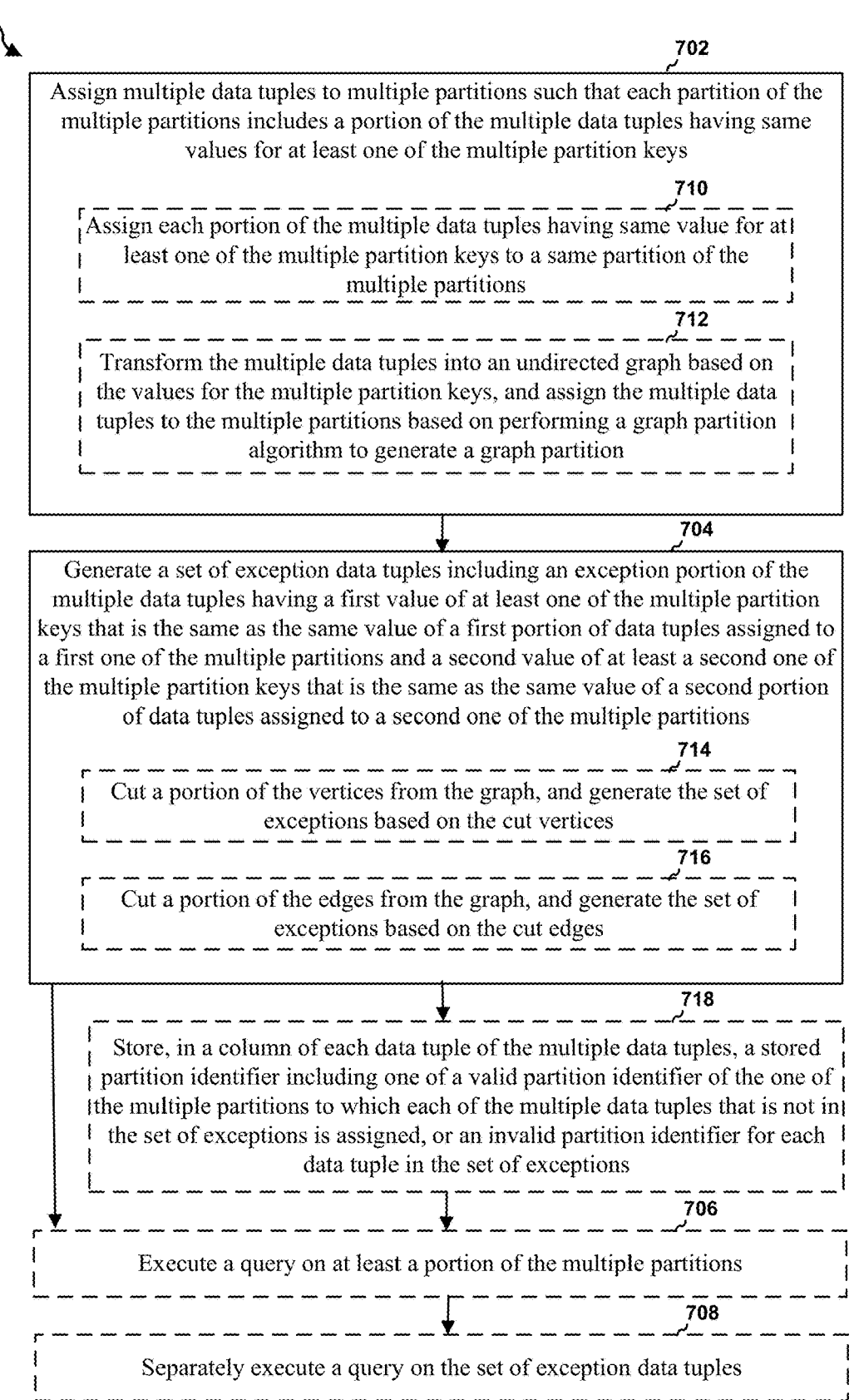

Assign multiple data tuples to multiple partitions such that each partition of the multiple partitions includes a portion of the multiple data tuples having same values for at least one of the multiple partition keys

710

Assign each portion of the multiple data tuples having same value for at least one of the multiple partition keys to a same partition of the multiple partitions

712

Transform the multiple data tuples into an undirected graph based on the values for the multiple partition keys, and assign the multiple data tuples to the multiple partitions based on performing a graph partition algorithm to generate a graph partition

704

Generate a set of exception data tuples including an exception portion of the multiple data tuples having a first value of at least one of the multiple partition keys that is the same as the same value of a first portion of data tuples assigned to a first one of the multiple partitions and a second value of at least a second one of the multiple partition keys that is the same as the same value of a second portion of data tuples assigned to a second one of the multiple partitions

714

Cut a portion of the vertices from the graph, and generate the set of exceptions based on the cut vertices

716

Cut a portion of the edges from the graph, and generate the set of exceptions based on the cut edges

718

Store, in a column of each data tuple of the multiple data tuples, a stored partition identifier including one of a valid partition identifier of the one of the multiple partitions to which each of the multiple data tuples that is not in the set of exceptions is assigned, or an invalid partition identifier for each data tuple in the set of exceptions

706

Execute a query on at least a portion of the multiple partitions

708

Separately execute a query on the set of exception data tuples

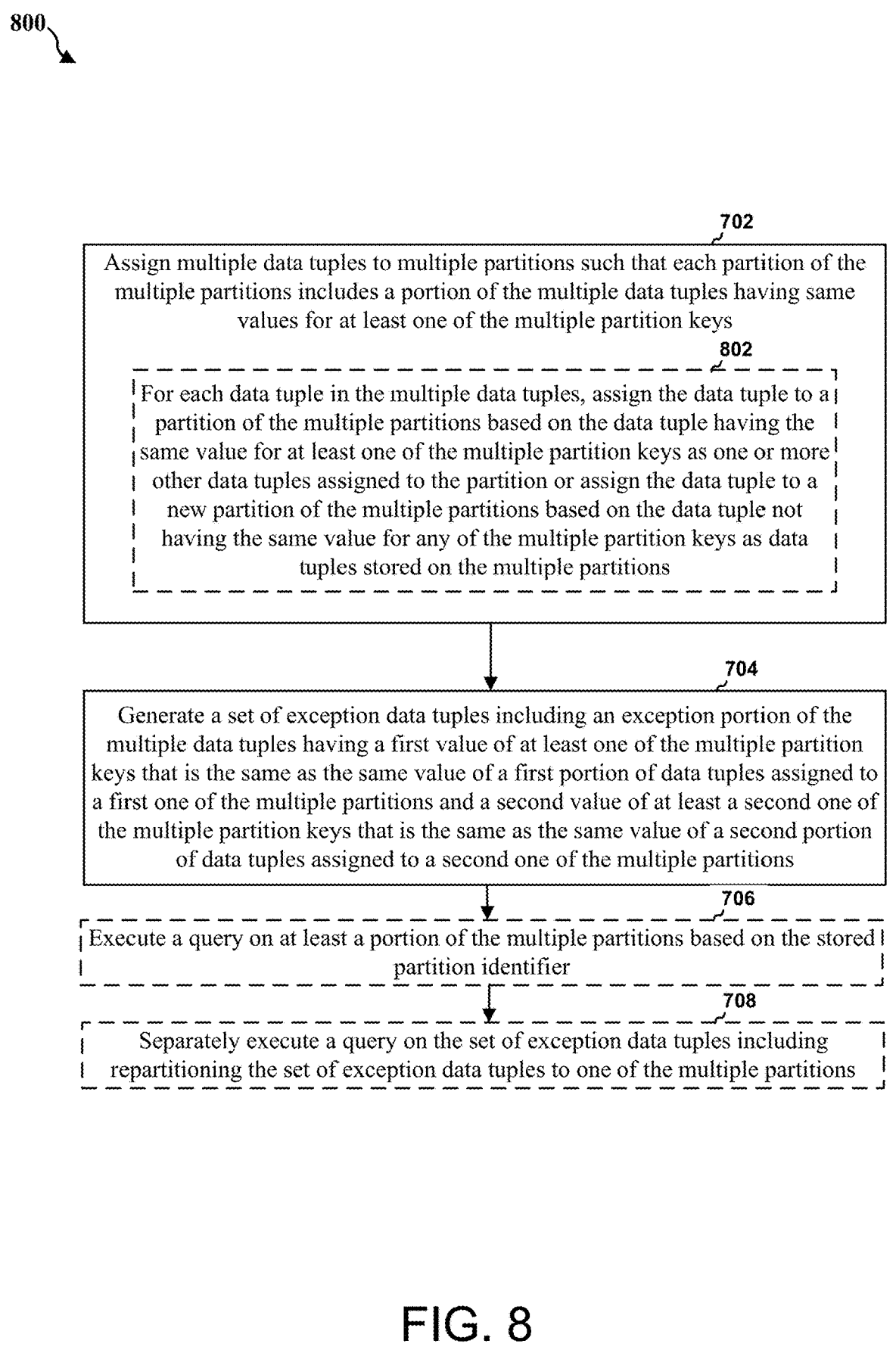

Assign multiple data tuples to multiple partitions such that each partition of the multiple partitions includes a portion of the multiple data tuples having same values for at least one of the multiple partition keys

802

For each data tuple in the multiple data tuples, assign the data tuple to a partition of the multiple partitions based on the data tuple having the same value for at least one of the multiple partition keys as one or more other data tuples assigned to the partition or assign the data tuple to a new partition of the multiple partitions based on the data tuple not having the same value for any of the multiple partition keys as data tuples stored on the multiple partitions

704

Generate a set of exception data tuples including an exception portion of the multiple data tuples having a first value of at least one of the multiple partition keys that is the same as the same value of a first portion of data tuples assigned to a first one of the multiple partitions and a second value of at least a second one of the multiple partition keys that is the same as the same value of a second portion of data tuples assigned to a second one of the multiple partitions

706

Execute a query on at least a portion of the multiple partitions based on the stored partition identifier

708

Separately execute a query on the set of exception data tuples including repartitioning the set of exception data tuples to one of the multiple partitions

FIG. 8

PATCHED MULTI-KEY PARTITIONING FOR ROBUST QUERY PERFORMANCE

CLAIM OF PRIORITY UNDER 35 U.S.C. § 119

The present Application for Patent claims priority to Provisional Patent Application No. 63/496,583, entitled "PATCHED MULTI-KEY PARTITIONING FOR ROBUST QUERY PERFORMANCE" filed Apr. 17, 2023, which is assigned to the assignee hereof and hereby expressly incorporated by reference herein for all purposes.

FIELD

The disclosure relates to databases.

BACKGROUND

Modern data analytics include queries over large amounts of data. In order to cope with the data size, modern warehouse solutions (either on-premise or cloud) are typically designed as massively parallel processing (MPP) systems. Data partitioning, e.g., distributing chunks of data over cluster nodes in order to perform subqueries on them in parallel, can provide for efficient query processing in this context. A partitioning of a relational table is defined as a disjunct split of tuples in the table and is realized using different partitioning strategies. While random partitioning or round-robin partitioning assign tuples to partitions randomly or based on their position in the table, value-based partitioning like hash partitioning or range partitioning distribute data based on the values of a chosen partition key column. The design of these partitioning strategies also aims at fulfilling the requirements of load balancing and exploiting partitioning information in query processing. While random and round-robin partitioning result in nearly perfectly balanced partition sizes, their information cannot be exploited in query optimization. On the other hand, range partitioning can be used for partition pruning in queries containing filters and hash partitioning can be exploited for partition-local execution of joins and aggregations when the partition key column matches the join or grouping key. However, load balancing hardly depends on the value distribution, leading to possibly imbalanced partitions for skewed data.

Value based partitioning strategies face issues as well, such as the quality of partitioning heavily depending on the choice of the partition key to find a balanced partitioning, but also to allow partition-local execution of queries in as many cases as possible. When a user does not know which partition key to choose and the partition key consequently does not match the join or grouping column in a query, data needs to be repartitioned during query execution in order to allow parallel query execution. This repartitioning involves expensive network transfer between workers and can lead to undesirable query performance when choosing a sub-optimal partition key. Defining multiple partition keys (e.g., having a multi-key partitioning) may not be possible in this context without replicating the data to store it in different ways. Use cases for multi-key partitioning occur frequently in real world. Modern data warehouse applications contain a large number of fact and dimension tables combined in a complex schema. In some cases, in addition to the foreign keys, there might be also columns in the fact table that are frequently used for aggregations, e.g., market segments or business units. Selecting which column should be used as a partition key may be challenging. Partitioning on one of the foreign keys may result in a fast join with the respective dimension, but slower joins on other dimensions and slow aggregations on any other grouping column.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, the disclosure provides A computer-implemented method for partitioning multiple data tuples stored in a database system to multiple partitions based on multiple partition keys, including assigning the multiple data tuples to multiple partitions such that each partition of the multiple partitions includes a portion of the multiple data tuples having same values for at least one of the multiple partition keys, and generating a set of exception data tuples. The set of exception data tuples include an exception portion of the multiple data tuples having a first value of at least a first one of the multiple partition keys that is the same as the same value of a first portion of data tuples assigned to a first one of the multiple partitions, and a second value of at least a second one of the multiple partition keys that is the same as the same value of a second portion of data tuples assigned to a second one of the multiple partitions.

In another aspect, the disclosure provides a system for partitioning multiple data tuples stored in a database system to multiple partitions based on multiple partition keys including one or more memories configured to store instructions, and one or more processors communicatively coupled with the one or more memories. The one or more processors are configured to assign the multiple data tuples to multiple partitions such that each partition of the multiple partitions includes a portion of the multiple data tuples having same values for at least one of the multiple partition keys, and generate a set of exception data tuples. The set of exception data tuples includes an exception portion of the multiple data tuples having a first value of at least a first one of the multiple partition keys that is the same as the same value of a first portion of data tuples assigned to a first one of the multiple partitions, and a second value of at least a second one of the multiple partition keys that is the same as the same value of a second portion of data tuples assigned to a second one of the multiple partitions.

In other aspects, the disclosure provides a computer-readable medium comprising code executable by one or more processors for partitioning multiple data tuples stored in a database system to multiple partitions based on multiple partition keys. The code includes code for assigning the multiple data tuples to multiple partitions such that each partition of the multiple partitions includes a portion of the multiple data tuples having same values for at least one of the multiple partition keys, and generating a set of exception data tuples. The set of exception data tuples includes an exception portion of the multiple data tuples having a first value of at least a first one of the multiple partition keys that is the same as the same value of a first portion of data tuples assigned to a first one of the multiple partitions, and a second value of at least a second one of the multiple partition keys that is the same as the same value of a second portion of data tuples assigned to a second one of the multiple partitions.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

FIG. 7 illustrates an example of a method of database operation for partitioning data tuples using multiple partition keys, in accordance with aspects described herein;

FIG. 8 illustrates an example of a method of database operation for iteratively partitioning data tuples using multiple partition keys, in accordance with aspects described herein;

DETAILED DESCRIPTION

Figure 1:
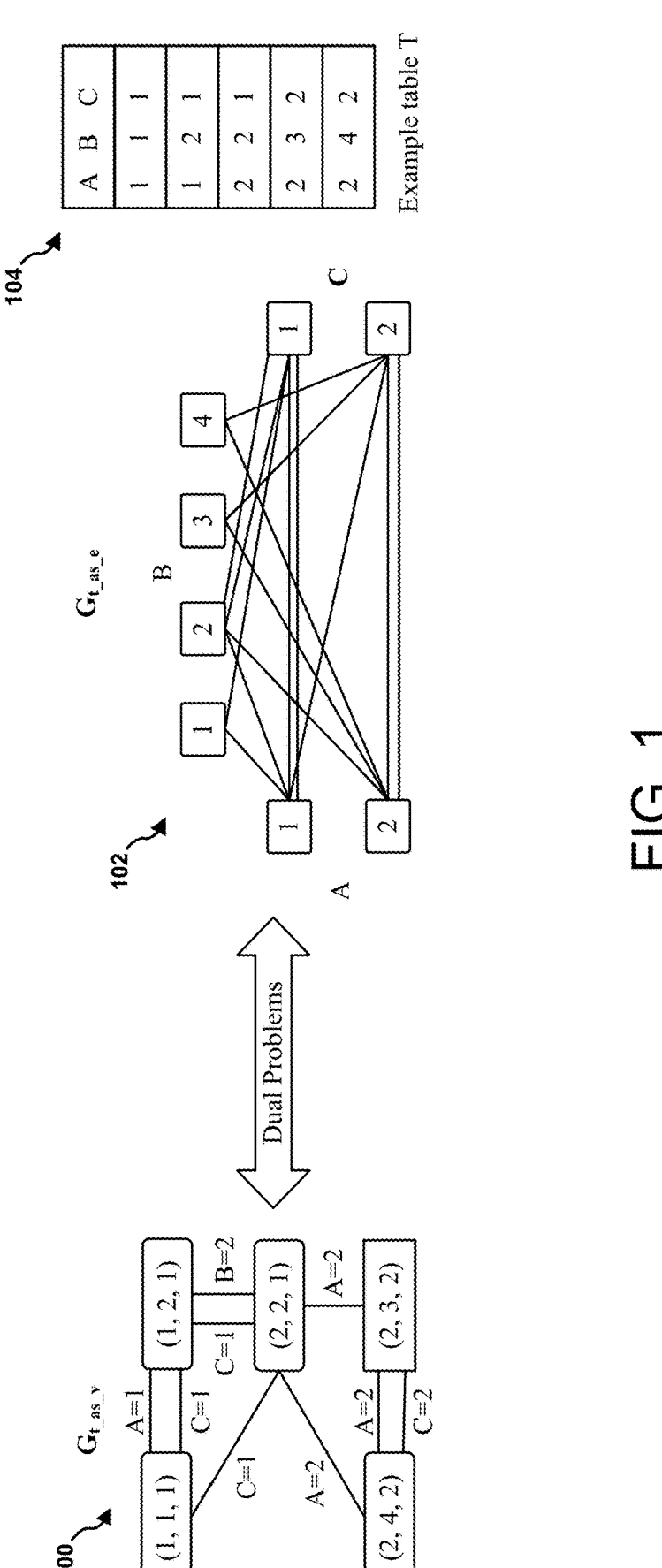
FIG. 1 illustrates an example of graphs generated using a multigraph construction based on a table of data, in accordance with aspects described herein.

Incorporated in its entirety by reference is "Patched Multi-Key Partitioning for Robust Query Performance" by Steffen Kläbe and Kai-Uwe Sattler. 2023, in Proceedings of the 26th International Conference on Extending Database Technology (EDBT). 324-336. ISBN: 978-3-89318-093-6 (referred to hereinafter as "Kläbe"). Kläbe relates to patched multi-key partitioning, allowing to define multiple partition keys simultaneously without data replication. In Kläbe, the relational table partitioning problem can be mapped to a graph partition problem in order to use existing graph partitioning algorithms to find connectivity components in the data and separately maintain exceptions (patches) to the partitioning. Patched multi-key partitioning can offer opportunities for achieving robust query performance, e.g., reaching desirable query performance for many queries instead of optimal or undesirable performance for only a few queries. For example, query performance can include time and/or resource cost for performing the query, and thus a desirable or improved query performance can use less resources or take less time than an undesirable query performance. Patched multi-key partitioning can be used to define the set of connectivity components in the data and PatchIndexes are used to maintain the separate set of exceptions for the patched multi-key partitions, and/or to facilitate query processing for the patched multi-key partitions.

PatchIndexes are generic index structures that allow the definition of approximate constraints. As typical database constraints like uniqueness can only be defined on columns that fulfill the constraint for all tuples, the useful information that all but a few tuples match a constraint cannot be expressed. PatchIndexes maintain exceptions to certain constraints as sets of patches as defined in the following and make this information usable during query optimization and query execution. A set of patches may be implemented using PatchIndexes, such as those described in PatchIndex—Exploiting Approximate Constraints in Self managing Databases" by Steffen Kläbe, Kai-Uwe Sattler, and Stephan Baumann. 2020, in 2020 IEEE 36th International Conference on Data Engineering Workshops (ICDEW). 139-146. https://doi.org/10.1109/ICDEW49219.2020.00014 ISSN: 24733490, which is incorporated herein by reference. For example, the set of patches can be defined as follows. Let relation R be a set of tuples t, $id(t) \in N$ the tuple identifier of t and cols (R) the set of columns of R. For a column C a set of patches $P_C \subseteq \{id(t) | t \in R\}$ can be defined. Based on this, $R_{P_C} = \{t \in R | id (t) \in P_C\}$ can be defined as the set of tuples of R whose tuple identifiers are in $P_C$ and $R_{\backslash P_C} = \{t \in R | id(t) \notin P_C\}$ as the set of tuples of R whose tuple identifiers are not in $P_C$.

PatchIndexes maintain sets of patches in a sharded bitmap data structure, allowing fast sequential access over an iterator for the index scan while also offering efficient insert, update and delete operations. The PatchIndex scan is designed to split tuples on-the-fly into tuples matching a constraint and tuples not matching the constraint, which can be realized using filter operators with modes use_patches and exclude_patches to iterate over the bitmap to make the splitting decision. Consequently, both dataflows can be optimized separately, typically by dropping expensive operations on the tuples matching the constraint. PatchIndexes are generically extendable for different constraints by implementing an interface for initial creation (e.g., finding an initial set of patches), update support (e.g., maintaining the set of patches under updates), and an optimizer rule to apply PatchIndex-based query transformations. Aspects described herein can add the new constraint of a patched multi-key partitioning to PatchIndexes. The PatchIndex approach can enable patched multi-key partitioning, e.g., maintaining elements that do not match the partitioning criteria. Conceptually, relational data can be mapped to graphs in order to apply existing graph partitioning algorithms, and PatchIndexes can maintain graph elements that are removed as exceptions.

Multi-key partitioning is described herein with respect to using two partition keys for ease of explanation. In some examples, more than two partition keys can be used by extending the definitions and functions to substantially any number of keys. Multi-key partitioning can be defined as follows for two keys: Let relation R be a set of tuples t, cols (R) be the set of columns of R, columns A,B∈ cols (R) be the partition keys and n be the number of partitions. Furthermore, t(X) can be the value of tuple t in column X. Then, a function $p = P_{A,B,n} : R \rightarrow \{1, 2, \dots, n\}$ can be called a multi-partitioning function if it has the following properties:

$$(MK1) \forall\ t_1, t_2 \in R:\ t_1(A) = t_2(A) \Rightarrow p(t_1) = p(t_2)$$

-continued $$(MK2) \forall\, t_1,\, t_2 \in R\!: t_1(B) = t_2(B) \Rightarrow p(t_1) = p(t_2)$$

Where (MK1) can represent partition locality for A and (MK2) can represent partition locality for B, which can intuitively indicate that all tuples sharing the same attribute value in one of the partition keys are assigned to the same partition. The partition locality may be required for partition-local execution of joins and aggregations. Only if tuples holding the same column value for a column X are assigned to the same partition, it can be ensured that all matching join partners in joins or all group members in aggregations can be found in the same partition when joining or grouping on that column X. Consequently, expensive data repartitioning is not needed in this case. Combining (MK1) and (MK2) can result in enabling this partition-local execution for all sub-keys of a combined partition key, e.g., achieving partition-local execution on both columns A and B separately if the table was partitioned on (A, B), independent on the column values of the respective other key. As a result of providing partition locality for each single-column subkey of the partition key, the multi-key partition function can automatically provide partition locality for all multi-key (sub)keys of the partition key, including the whole partition key itself. This can be apparent from the conjunction of (MK1) and (MK2) and also holds for all subkeys of multi-key partition keys on more than two columns.

Besides the requirement to enable partition-local query execution, a partition function may also produce a balanced partitioning to avoid load imbalance. Balanced partitioning can be defined by calling a partitioning of table into partitions $P_i$ with $i \in \{1, \ldots, n\}$ balanced with an imbalance factor $$\alpha = \frac{\max_{i \in \{1,\ldots,n\}}\{|P_i|\}}{\min_{k \in \{1,\ldots,n\}}\{|P_k|\}}.$$

An imbalance factor $\alpha$ near 1 can indicate a nearly balanced partitioning.

In accordance with aspects described herein, the multi-key partitioning definition described above can be relaxed to introduce patched multi-key partitioning by allowing exceptions to the partitioning constraint. For example, patched multi-key partitioning can be defined as follows: Let relation R be a set of tuples t, cols (R) be the set of columns of R, columns A, B $\in$ cols (R) be the partition keys and n be the number of partitions. Furthermore, t(X) can be the value of tuple t in column X and assume the existence of a set of patches $P_C$ for every partition key column $C \in \{A, B\}$. Then, a function $p = P_{A,B,n}\!:\! R \to \{1, 2, \ldots, n\}$ can be called a patched multi-partitioning function if it has the following properties:

$$(PMK1) \forall\, t_1,\, t_2 \in R \backslash P_A\!: t_1(A) = t_2(A) \Rightarrow p(t_1) = p(t_2)$$

$$(PMK2) \forall\, t_1,\, t_2 \in R \backslash P_B\!: t_1(B) = t_2(B) \Rightarrow p(t_1) = p(t_2)$$

Intuitively, (PMK1) and (PMK2) can relax the partition locality to tuples that are not included in the set of patches for the respective column. The definition also does not restrict the size of the set of patches, e.g., a trivial solution would be to assign all tuples to the sets of patches. In one example, this definition can allow for constructing both a partition function and small sets of patches for the partition key columns, such that the defined constraints are met.

One example of an algorithm for iterative graph partition assignment in this context can include the following:

```
Input : Relation R = {t_i |0 ≤ i ≤ n}, Partition keys K ⊆ cols (R)
Output : Set of partitions P = {P_i |P_i ⊆ R, i ∈ N, ∪ P_i = R, ∀i ≠ k ∈ N :
P_i ∩ P_k = Ø}
1          P ← { }
2          while R \ ∪ P ≠ Ø do
3              ΔR ← R \ ∪ P
4              X ← { }
5              X ' ← {t} for some t ∈ ΔR
6              while X ≠ X ' do
7                  X ←X '
8                  for k ∈ K do
9                      // No duplicates due to set semantics, so no need
                         to adapt ΔR
10                     X ' ←X ' ∪ {t ∈ ΔR|∃t ' ∈ X ' : t (k) = t '(k)}
11             P ← P ∪ {X} ;
12         return P
```

This algorithm can facilitate iteratively building data partitions by starting at a single tuple and adding tuples in order to match (MK1) and (MK2), which means that in one step all tuples with matching values in one of the partition keys can be added, and repeat until no tuples are available to add. If there are still unassigned tuples, this behavior can be repeated starting with an unassigned tuple. The resulting partitions can then be used directly as table partitions or assigned to physical partitions using a physical allocation strategy. In an example, for five tuples, $t_1, t_2, t_3, t_4, t_5$, having the following values for keys A, B:

| Tuple | A | B |
|-------|---|---|
| $t_1$ | 1 | 1 |
| $t_2$ | 1 | 2 |
| $t_3$ | 2 | 3 |
| $t_4$ | 3 | 3 |
| $t_5$ | 2 | 4 | multi-key partitioning may be performed using the above algorithm as follows. Starting with tuple $t_1$ in the first partition $P_1$, $t_2$ can be added to partition $P_1$ in the first step as $t_2$ also contains the column value $t_2(A)=1$. The loop can terminate after checking that no more tuples share values for columns A or B with tuples in partition $P_1$. As not all tuples are assigned yet, a second partition $P_2$ can be created initially including tuple $t_3$. $t_5$ can be added next due to a matching value in column A and $t_4$ can be added due to matching value in column B. The final partitioning can include two partitions, $P_1$ and $P_2$.

In some examples, this approach may produce a single large partition for most datasets and partition keys. Even if it discovers multiple partitions in the data, the number of physical partitions and their size is determined by this "natural" number of partitions in the given dataset. Partitions can be allocated to physical partitions to reduce the number of partitions, but more partitions than "naturally" discovered cannot be filled. In another example, if tuple $t_5$ had a value B=1 (e.g., instead of B=4), then $t_5$ can also be added to $P_1$ as $t_5(B)=t_1(B)$ and hence there can be only one partition satisfying (PMK1) and (PMK2). However, if the value A=2 is considered an exception, $t_5$ would not need to be assigned to $P_2$, but could be assigned to $P_1$ based on B=1. A query with a grouping on column B could be executed partition-locally without the need for data repartitioning. Grouping on A also does not require to repartition all tuples, but only the tuples holding the exception value A=2. Other examples of performing multi-key partitioning can include performing graph partitioning or iterative patched partitioning, as described herein.

In some examples, multi-key partitioning intuitively can be transferred to graph algorithms. The constraints that once a tuple is assigned to a partition, every other tuple sharing the same value in at least one of the partition key columns must be assigned to the same partition, are similar to following paths in a graph to discover its connected components. The "natural" partitions discovered using the algorithm above can accordingly include the connected components of a graph constructed from the tuples of the given dataset. A mapping of relations to graphs can be defined and existing graph partitioning algorithms can be used as a first approach for meeting the goal of finding sets of patches and a partitioning function according to the definition of patched multi-key partitioning presented above. Using graph partitioning algorithms can include one or more the following actions: (1) map the input table to a graph based on the partition keys; (2) apply a graph partition algorithm on the graph, which can result in an assignment of vertices/edges to a graph partition; (3) map the graph partitions back to table partitions; and/or (4) define set of patches based on overlapping vertices or edges. By defining the mapping between graphs and tables, one or more graph partitioning algorithms can be used to achieve the multi-key partitioning.

Mapping a table to a graph can be based on a chosen set of partition keys and can be done in multiple ways. Two examples are described herein, including modeling tuples of the table as vertices or as edges. For example, modeling tuples as vertices can include the following actions. Assume a Relation R and a set of partition keys $P\subseteq cols(R)$. A multigraph $G_{t\_as\_v}(R)=(V, E)$ can be defined that represents the relation R with $V=\{t|t\in R(P)\}$ and $E=\{(u, v)k|u, v\in R, u\neq v, k\in P:u(k)=v(k)\}$. For example, modeling tuples as edges can include the following actions. Assume a Relation R and a set of partition keys $P\subseteq cols(R)$. A multigraph $G_{t\_as\_e}(R)=(V', E')$ can be defined that represents the relation R with $V'=\{v|\exists k\in P:v\in R(k)\}$ and $E'=\{(u, v)_r|t\in R, k_1, k_2\in P, k_1\neq k_2:t(k_1)=u\wedge t(k_2)=v\}$.

The graph $G_{t\_as\_v}(R)$ includes a vertex for each distinct combination of partition key values of R and an edge between two vertices for each shared partition key value. On the other hand, $G_{t\_as\_e}(R)$ is a multipartite graph and includes a vertex for each distinct partition key value and an edge between two vertices for each tuple in R that includes the respective partition key values. As columns might share column values leading to conflicts in vertex identifiers, a unique mapping between partition key values and vertex identifiers can be used. Both graph constructions can be defined as multigraphs, which could be replaced by constructing a weighted graph with weights indicating the number of tuples holding the pair of values in the case of $G_{t\_as\_e}$ or the number of equal partition key values in the case of $G_{t\_as\_v}$. Both approaches work similarly and the choice between them can be impacted by the expected input of the graph partitioning algorithm. Conceptually, an edge with a large weight indicates the same graph connectivity as multiple edges between vertices.

FIG. 1 illustrates an example of graphs 100 and 102 generated using the multigraph construction based on table 104. For example, there are two edges between the vertices (2, 4, 2) and (2, 3, 2) in $G_{t\_as\_v}$ graph 100 or two edges between A=2 and C=2 in $G_{t\_as\_e}$ graph 102 respectively. The resulting temporary graphs can be larger than the original table. Either construction over SQL queries to create the graph representation from a given database table can be realized. The graph representation can be determined by the expected input of the used graph partitioning algorithm. In one example, a flat file containing a list of edges can be produced.

Figure 2:
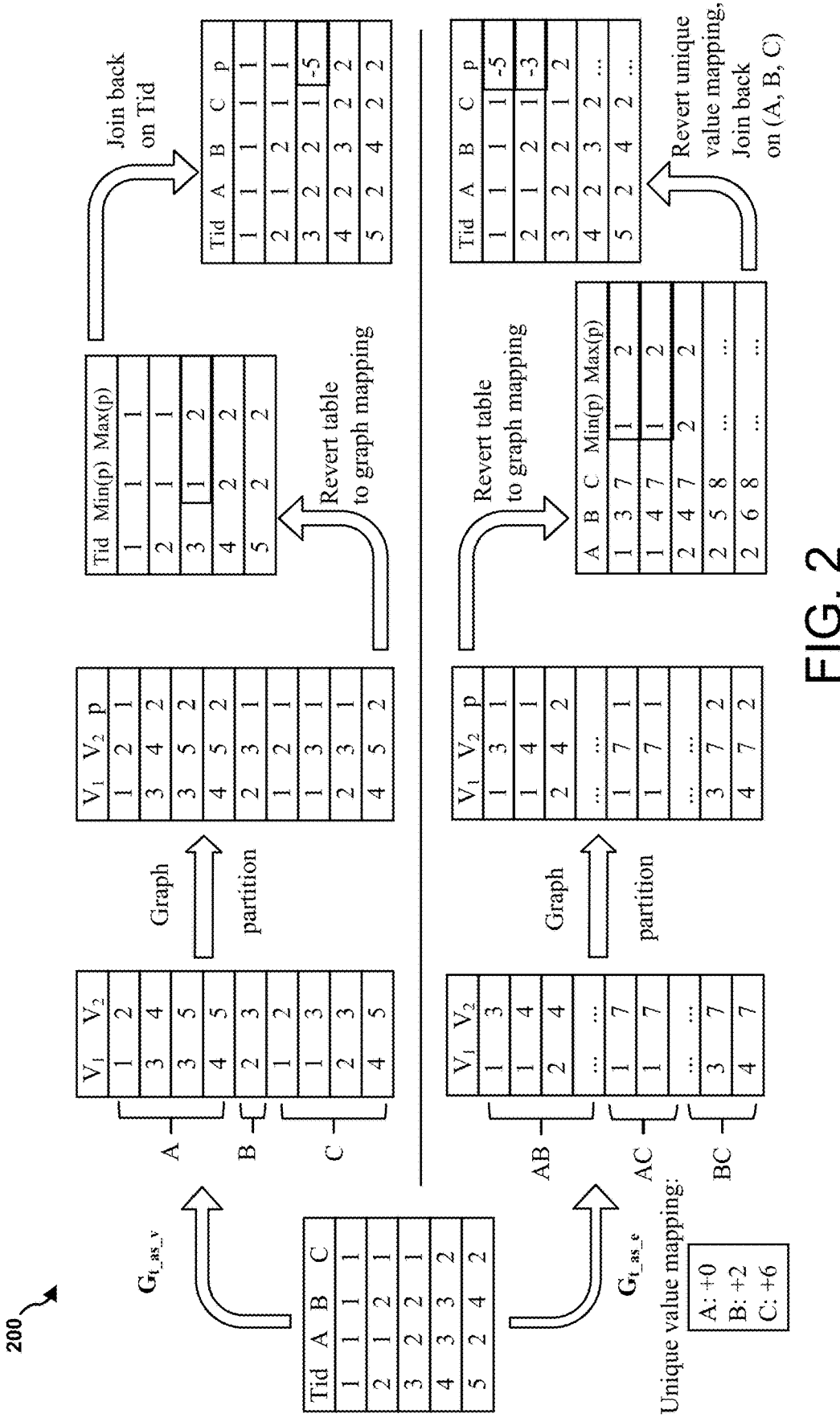
FIG. 2 illustrates an example of an end-to-end workflow for a graph partitioning approach, in accordance with aspects described herein.

FIG. 2 illustrates an example of an end-to-end workflow 200 for the graph partitioning approach. For $G_{t\_as\_v}$, tuple identifiers can be used as vertex identifiers and edges can be calculated by separately performing a self join of the table for every partition key and combining the results using a union. For $G_{t\_as\_e}$, the column values of the partition keys can be used as vertex identifiers and a unique column mapping can be applied (e.g., by adding the running sum of maximum values of other partition keys). The two-element subsets of the partition key can be projected, the unique column value mapping can be applied, and a union the results can be performed for each subset.

In applying a graph partitioning algorithm on the constructed graph, a vertex-cut or edge-cut algorithm can be used, and/or both alternatives can be applied to both possible graph constructions. While vertex-cut algorithms assign edges to partitions and cut vertices from the graph, edge-cut algorithms assign vertices to partitions and cut edges from the graph. Cutting the equivalent of tuples in the graph, e.g., edge-cut in $G_{t\_as\_e}$ and/or vertex-cut in $G_{t\_as\_v}$, as described above, cuts whole tuples and consequently can lead to a single set of patches for the whole table. Using the respective other variant leads to a single set of patches for each of the partition key columns. This can offer more flexibility, and smaller sets of patches can be expected when separately querying columns of the partition key.

The remaining two options, e.g., performing an edge-cut on $G_{t\_as\_e}$ or a vertex-cut on $G_{t\_as\_v}$ may also show some challenges. In $G_{t\_as\_v}$, edges represent a common column value between two tuples. Removing an edge from the graph however only has a local impact and does not impact other edges representing the same column value. As described above and further herein, when describing query execution using PatchIndexes, all tuples sharing a column value that was marked as an exception can be repartitioned. Consequently, all edges with a common column value can be removed when removing one of them, e.g., removing all edges representing A=2 in FIG. 1. Conceptually, this issue may be caused by the fact that a single column value is represented by multiple graph objects, e.g., multiple edges in this case. On the other hand, $G_{t\_as\_e}$ shares a similar feature in that tuples are represented by multiple edges. Performing a vertex-cut on $G_{t\_as\_e}$ assigns edges to partitions and could therefore possibly assign a tuple to different partitions, which may lead to conflicts when mapping the graph back to the table.

The property of finding a balanced partitioning and minimizing the number of cut graph objects (and minimizing the sets of patches later) relies on the properties of the graph partitioning algorithm. In one example, a graph partitioning algorithm such as DistributedNE can be used. DistributedNE starts with a random edge per partition, iteratively grows partitions in parallel using neighbor expansion and performs synchronization between the expansion rounds. DistributedNE finds a local optimum, but due to the random starting point selection it does not guarantee a global optimum.

After the partitioned graph is created, it can be mapped back to the relational table, which can include finding a partition function and sets of patches for partition key columns in order to meet the constraints of a patched multi-key partitioning. After applying the graph partitioning algorithm that assigned graph elements to partitions, the graph construction can be reversed by adding the assigned partition to the respective tuple as an additional table column. In this regard, for example, the partitioning function can be materialized as a mapping directly in the table. Afterwards, the table can be repartitioned on the graph partition column using regular hash partitioning. DistributedNE can perform a vertex cut, so it assigns edges to partitions. To reverse the mapping described above, a table of schema (vertex1, vertex2, partition_id) can be created from the partitioning result file (e.g., as shown in FIG. 2) to perform the mapping again over SQL.

For $G_{t\_as\_v}$ a mapping of partition identifiers to tuple identifiers can be produced by projecting (vertex1, partition_id) and (vertex2, partition_id) and performing a union before grouping on the vertex column and computing the minimum and maximum partition_id. If the minimum and maximum match, the tuple was not cut from the graph by the vertex cut, and the partition_id can be applied for the tuple. Otherwise, a negative value for the partition_id (or other indicator of an exception) can be applied, and the tuple can later be assigned to the sets of patches.

For $G_{t\_as\_e}$, the table to reconstruct the two-element partition key subset can be split based on filter predicates (e.g., using the unique value mapping). These parts can then be joined to reconstruct a mapping table of schema (partition_key_columns, partition_id). Grouping can be performed on the partition key columns, and the minimum and maximum partition_id can be calculated to discover and mark conflicts, as in the $G_{t\_as\_v}$ case described above. For both cases, the partition_ids calculated by the graph partitioning can be assigned to different physical table partitions. In an example, the partition_ids can be updated with values that are ensured to be assigned to different partitions. These values can be easily calculated if the hash function used for hash partitioning is exposed over the SQL frontend of the database system. The reverted mapping tables can be finally joined back with the fact table on the tuple identifier for $G_{t\_as\_v}$, or on the partition keys for $G_{t\_as\_e}$ in order to update the materialized partition_id column.

The patches can then be identified to create the set of exceptions. Graph elements that have adjacent graph elements with different partitions can be exceptions, and can be removed from the graph in the graph partitioning. Similarly, the table can be queried for each partition key to identify partition key values holding more than one distinct partition_id or a negative partition_id, indicating a conflict from the graph to table mapping. These tuples can be declared as exceptions and assigned to the set of patches for the respective partition key column. In the $G_{t\_as\_v}$ case, e.g., as in FIG. 2, all tuples with A=2 would be included in the set of patches PA for column A, tuples with B=2 in PB and tuples with C=1 in $P_C$ respectively, because tuples holding these values have either more than one distinct partition_id or a negative partition_id.

The approach of mapping a relational table to a graph, using existing graph partitioning algorithms to partition the constructed graph and infer the table partitioning from the graph partitioning is one way of combining both to apply the desirable characteristics of graph algorithms to relational tables. This approach can require that the dataset be completely loaded before graph partitioning can be invoked. This is fundamentally different from a typical data ingestion pipeline, where tuples are iteratively loaded (in parallel), and decisions on partition assignment are made locally to a tuple instead of considering the whole table. Consequently, the table may need to be repartitioned after it was already loaded to apply the graph partitioning. In addition, data layouts in analytical database systems fundamentally differ from data layouts in graph databases, so data reorganization or data transport may be required. For example, the constructed graph can be exported from the database in order to use it as an input for DistributedNE. Although iterative extensions that would enable iterative partition assignments during loading may exist, they may require reconstructing the graph when data should be appended to an existing table or the constructed graph may need to be maintained as a separate copy of the data during the table lifetime. In an example, an iterative patched multi-key partitioning may be additionally or alternatively utilized.

Iterative patched partitioning strategies may allow for deciding on partition assignments upon coming across a single tuple, but may not result in a most optimal partitioning. Iterative patched partitioning can include iteratively building and "coloring" a graph. Similar to hash partitioning, iterative patched partitioning can be used to generate an assignment decision as the tuple is loaded into the table. One example of an iterative graph partition assignment algorithm is shown below.

```
Input : *part_key_values, num_keys
Output :partition_id
 1    lookups ← part_assignment_lookup(part_key_values);
 2    if allNULLOrExceptions(lookups) then
 3        part ← f(part_key_values) ; // Case 1
 4    else if allNULLOrExceptionOrEqual (lookups) then
 5        part ← firstAssignment(lookups) ; // Case 2
 6    else
 7        global rotating_idx ; // Case 3: Conflict
 8        while lookups[rotating_idx] == NULL OR
               lookups[rotating_idx] == EXCEPTION do
 9            rotating_idx ← (rotating_idx + 1) % num_keys ;
10            part ←lookups[rotating_idx];
11            rotating_idx ← (rotating_idx + 1) % num_keys ;
12     global partition_mappings ;
13     for i = 0; i < num_keys; i = i + 1 do
14         if lookups[i] == NULL then
15             partition_mapping[i].insert(part_key_values [i], part)
16         else if lookups[i] ≠ part then
17             partition_mapping[i].update(part_key_values [i],
                   EXCEPTION)
18     return part ; // Partition_id for given tuple
```

This algorithm can be based on the $G_{t\_as\_e}$ construction and can intuitively hold an assignment of values to partitions for each column of the partition key. For each tuple, three cases can be considered: (1) if there is no partition assignment for any of the partition key values yet, a partition function $f$ can be applied on the tuple; (2) if there are some key values that already have an assignment (because they already occurred before) and all of these partition_ids match, the tuple can be assigned to this partition, matching the intuition that tuples sharing a partition key value are assigned to the same partition; or (3) if there are key values already assigned to a partition and these assignments do not match, the tuple can be included in the set of exceptions. In this last case, there can be a conflict as the tuple would conceptually connect two connectivity components in the iteratively built graph. Previous decisions to join these connectivity components and decide for one partition key to be the decisive key cannot be reverted, so the tuple will be an exception for every other column when later discovering the sets of patches. The choice for the decisive key follows a rotating schema in order to distribute exceptions over all partition key columns. In all cases, the assigned partition_id can be inserted into the assignment for every column that did not have an assignment before or update to the exception marker when hitting case 3, e.g., there is a partition_id for a value which was not chosen. The exception markers can be handled similarly to NULLs in case 1 and case 2, because they are not decisive.

Figure 3:
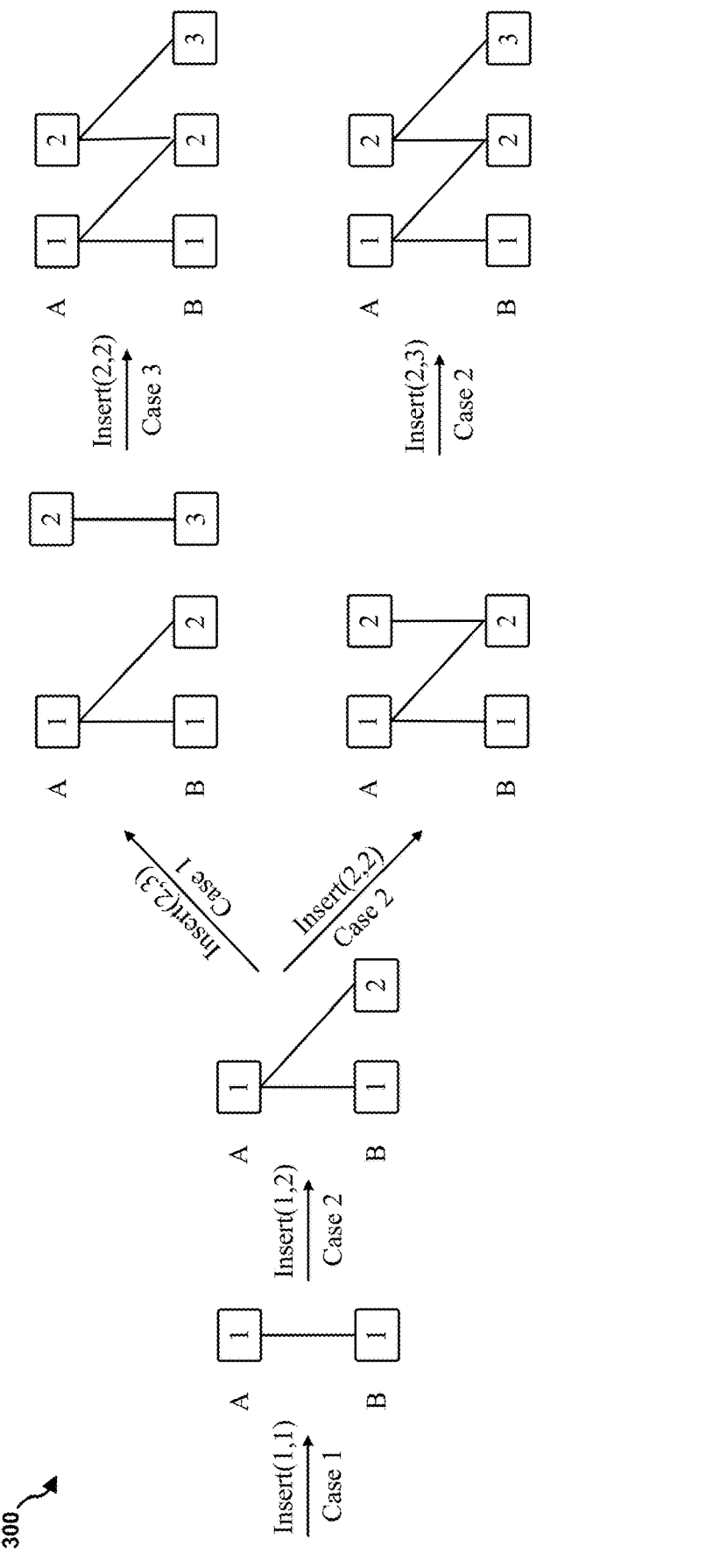
FIG. 3 illustrates an example of a process for inserting tuples that represent a path through a graph, in accordance with aspects described herein.

In some examples, due to the "local" decision in the conflict case, this algorithm may not be able to find a globally optimal partitioning with a minimum set of patches, and/or it may not have guarantees about partition balancing. The current sizes of each partition can be tracked, and the function $f$ can assign a tuple to the smallest partition in order to fill partitions as equally as possible. This algorithm may also be sensitive to the order of tuple insertion. FIG. 3 illustrates an example of a process 300 for inserting tuples that represent a path through a graph. In process 300, all tuples may be assigned to a single partition; thus, relying on an assumption that the first case is hit regularly during tuple insertion, tuples can be assigned to different partitions. For example, inserting the tuple with partition keys (2, 2) in the upper case of FIG. 3 and hitting case 3, the tuple (e.g., the edge) is assigned to the second partition according to key A (indicated by not connecting the edge), so all tuples with B=2 later belong to the set of patches PB, as they belong to different partitions. Due to the rotating index for choosing the decisive column, column B may be chosen as the decisive column when hitting case 3 for the next time in order to balance patches over all partition keys. However, having a decision-making process "local" to a tuple can enable on-the-fly partition assignments during data loading, avoiding expensive conversions and repartitionings of the graph partitioning approach. The algorithm can be designed as a single-threaded approach. In order to be integrated into parallel loading, access to the metadata structure may be secured using locks during performing the iterative graph partitioning assignment algorithm between reading the partition assignments and updating them. In an example, the partition assignment lookup can be performed again before updating to ensure that no updates were performed.

With the tuples partitioned based on multiple keys and the set of exceptions being generated, query processing over the partitioned tuples can be optimized. As described, for example, PatchIndexes are generic data structures that can be extended to arbitrary constraints by implementing an interface for PatchIndex creation, maintenance under updates and/or adding an optimizer rule to exploit PatchIndex information in query optimization. For example, after executing a graph partitioning algorithm or an iterative patched partitioning algorithm, as described above, PatchIndexes can be created on the partition key columns in order to maintain the exceptions to the partitioning. Sets of patches can exist per column, so separate index instances can be created. The sets of patches can maintain the tuple identifiers of all exceptions to the partitioning, e.g., all tuples that have a partition key value that is present in more than one partition or have a negative partition_id indicating a conflict when mapping the graph back to the table. The partition key values violating the partition constraint can be discovered by (1) running an aggregation query counting the distinct partition_ids of column values and selecting the ones having more than one distinct partition_id and/or (2) running a filter query to find all values with negative partition_ids. The union of (1) and (2) can be joined back with the table on the respective key column to find all tuple identifiers to be inserted into the PatchIndex. In the upper case of FIG. 3 all tuples with B=2 are exceptions, so tuple identifiers of tuples (1, 2) (assigned to the first partition) and (2, 2) (assigned to the second partition) can be inserted into the PatchIndex holding the set of patches PB. Partitioning can be transparent for the PatchIndex, so an index instance can be created per partition.

Materializing approximate constraints with PatchIndexes can be based on the idea to split query execution using the PatchIndex scan between tuples that match a certain constraint and exceptions to the constraints. The patched multi-key partitioning constraint defined above can be used to avoid expensive repartition/shuffle operations as tuples not included in $P_X$ for a given column X are known to match the Partition locality criteria. Consequently, these tuples do not need to be reshuffled. Partition locality can be important for aggregations and joins. For executing a partitioned aggregation, one or more of the following examples can be used if the grouping column does not match the partition key of the table. In one example, data can be reshuffled on the grouping key and the subsequent aggregation can be executed partition locally. This example can introduce network overhead for repartitioning. In another example, a pre-aggregation can be performed on the existing partitions, then data can be reshuffled and a post aggregation can be performed, which may be used as not all elements of a group are initially placed in the same partition. The aggregation function(s) may be decomposable, e.g., an average may not be executed in a stepwise fashion without breaking it into a sum and a count. A two-phase aggregation, in this regard, can be favorable when data contains few distinct values according to statistics, so the additional aggregation effort can be amortized by the less effort to shuffle data. Both variants can be enhanced by the patched partitioning constraint.

Figure 4:
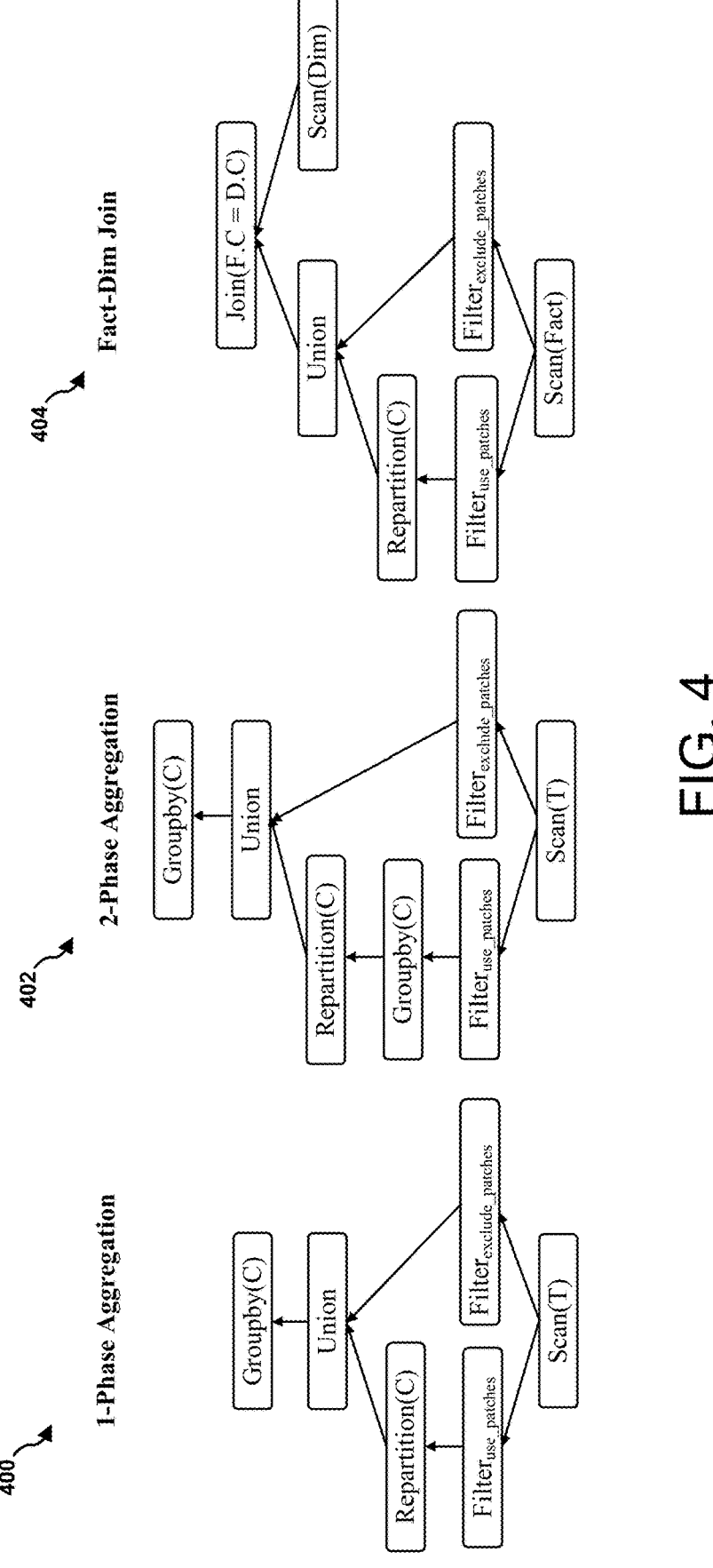
FIG. 4 illustrates examples of aggregation processes and a fact-dim join that can be performed in executing queries on the multi-key partitioned data, in accordance with aspects described herein.

FIG. 4 illustrates examples of aggregation processes 400 and 402 and a fact-dim join 404 that can be performed in executing queries on the multi-key partitioned data. For example, in one-phase aggregation, repartitioning can be skipped for tuples that are not included in the patches when aggregating on a patched partition key. For example, in two-phase aggregation, the pre-aggregation and repartitioning can be skipped for all tuples that are not included in the set of patches when aggregating on a patched partition key. Skipping these steps can be possible because either all tuples or no tuples sharing the same partition key value are handled as exceptions. Consequently, the number of tuples that are to be either reshuffled or pre-aggregated and reshuffled can be reduced. Splitting the data stream in this regard may introduce some overhead. In an example two-phase aggregation can be used when the grouping column only has a small amount of unique values (e.g., less than a threshold number of unique values), and thus the benefit of the PatchIndex optimization may be too small to amortize the overhead of added operators. As the number of exceptions are known during query optimization, the costs of both plans with and without the optimization can be estimated and a query optimizer can decide between them. Except adding linear costs for the filter operators with modes use_patches and exclude_patches, the above can be used in the cost model of an arbitrary optimizer without additional changes.

Join operators can also be performed in a partitioned way if tables are partitioned on the join key. In typical data warehouse applications, many joins are performed between fact tables and dimension tables. While the latter are typically partitioned on their primary keys, choosing the partition key of fact tables including many foreign keys is typically difficult. Including the foreign key in the patched multi-key partitioning and having a PatchIndex on the join column, however, can allow for avoiding the repartitioning for all tuples not included in the set of patches. This may require, however, the second table to be co-partitioned, which can be automatically ensured by using the same partitioning function in e.g., hash-partitioning. In an example, partitioning of the primary key side of the join can be derived from the fact table when the foreign key is included in the multi-key partitioning computation. Consequently, dimension key values that do not belong to the respective set of patches in the fact table can derive the same partition_id, while exceptions are assigned using common hash partition to be co-partitioned with the fact table exceptions after repartitioning. Deriving the partitioning can be a problem for shared dimensions, as only one fact table can be decisive for the dimension table partitioning. In an example, a smaller dimension table than a large fact table can instead be repartitioned.

In contrast to hash partitioning where data is not required to be reshuffled only if the partition key matches the grouping/join key, the described optimizations work with every key that was part of the patched multi-key partitioning. This can allow for achieving robust performance for aggregate/join queries on all keys of the multi-key partition key. The performance can depend on the amount of tuples that are categorized as exceptions and assigned to the sets of patches. Additionally, partition responsibilities of nodes do not change when querying different partition keys, so patched multi-key partitioning may also work for shared-nothing architectures. In addition, node local buffers may not be invalid for different queries. The queries shown in FIG. 4 are also allowed to have additional operators below the groupby/join operator, e.g., additional filters or projections. These additional operators would be replicated to both data streams including/excluding patches, so the operators can be separately applied to both data streams. In one example, the PatchIndex optimization rule may be applied on the lowest aggregation/join in the query tree.

The patched partitioning constraint can be maintained under update operations as well, such as inserts, modifies, and deletes. The PatchIndex data structure itself is designed in a generic way. The underlying sharded bitmap structure supports update operations, and an interface can be implemented to define how the set of patches is maintained under updates. Inserts can be handled similarly to the initial loading, so tuples get a partition_id assigned by the partition assignment algorithms described above as they are inserted or after insertion. In an example, an inserted tuple may connect two connectivity components of the graph representation, and thus the partition key column values become an exception. This can similarly happen for modifies on partition key values. Such exceptions can be discovered by using a join of the inserted/modified tuples with the table itself, performing the same distinct aggregation than during initial partitioning to find values with more than one unique partition_id assigned. The join can be small by only scanning the inserted/modified tuples on the one side and performing data pruning on the full table based on the observed join keys and small materialized aggregates on the table, to avoid a full table scan.

Delete operations may not connect graph components but may split components, which does not harm the partitioning constraint. In general, update operations may degenerate the graph and may lead to losing the optimality of the graph partitioning. By monitoring exception rates this might lead to a recomputation of the partitioning after some time.

Figure 5:
FIG. 5 illustrates an example of a computing system including a database system for partitioning data tuples, in accordance with aspects described herein.

FIG. 5 illustrates an example of a computing system 500 including a database system 502, in accordance with an aspect of the disclosure. The database system 502 has multiple architectural components including a data partitioner 520 for partitioning data in a data store 550, and/or as data is being input into the data store 550, into one or more partitions 505a or 505b, or into an exception set 540. In an example, the data partitioner 520 can include one or more of a graph partitioner 532 or an iterative partitioner 534 for portioning data tuples into one or more of partitions 505a and/or 505b or exception set 540, in accordance with aspects described herein. (A letter after a reference numeral, such as "505a," indicates that the text refers specifically to the element having that particular reference numeral, while a reference numeral in the text without a following letter, such as "505," refers to any or all of the elements in the figures bearing that reference numeral, i.e., "505a," "505b," "505c," etc.)

The database system 502 can include any type of processor, for example, standard x86 servers running Linux or multi-core systems. Users and applications may communicate with the database system 502 via standard interfaces, for example, American Nation Standards Institute (ANSI) structured query language (SQL) via open database connectivity (ODBC)/Java database connectivity (JDBC). The database system 502 is also interchangeably referred herein as "the system" or "database." In addition, the database system 502 can include one or more processors and/or one or more memories for executing instructions for using the data store 550 to store data tuples, for communicating with other computing devices to provide data thereto or receive data therefrom, for partitioning data tuples, etc., as described herein. Moreover, for example, partitions 505a and 505b can be provided on database system 502 or, as shown, by other nodes over a network 510 (e.g., in a cloud computing environment). For example, the other nodes can also include one or more processors, one or more memories, etc. for storing partitioned data from the database system 502.

The database system 502 performs processing and storing of data. The database system 502 controls sessions, parsing and optimizing queries, and scheduling execution of the workload. The database system 502 may be optimized for outward communication and handling of query overhead so the resources of the database system 502 are utilized for performing data operations.

The data store 550 stores data on a data storage device, for example, a disk. This data includes relations or tables comprising rows and columns of user data. For instance, example tables are $t_1$, $t_2$, $t_3$, . . . , tn, where table $t_1$ has columns a1, b1, c1, table $t_2$ has columns a2, b2, c2, table $t_3$ has columns a3, b3, c3, and so on unless indicated otherwise. In some aspects, data stored in one column is of the same data attributes. For example, data stored in the same column is of the same data type, character set, and collation attribute value.

The data partitioner 520 is configured to partition data tuples in the data store 550 or received for storing in database system 502 into multiple partitions, such as partition 505a and/or 505b and/or can generate an exception set 540 of data tuples that are not associated with the one or more partitions 505a and/or 505b. In one example, the data partitioner 520 can partition the data tuples by using a graph partitioner 532 to map the data tuples to a graph based on multiple partition keys, in accordance with aspects described herein. In another example, the data partitioner 520 can partition the data tuples by using an iterative partitioner 534 to iterate through the input data and add the input data to one or more partitions 505a and/or 505b, in accordance with aspects described herein.

Figure 6:
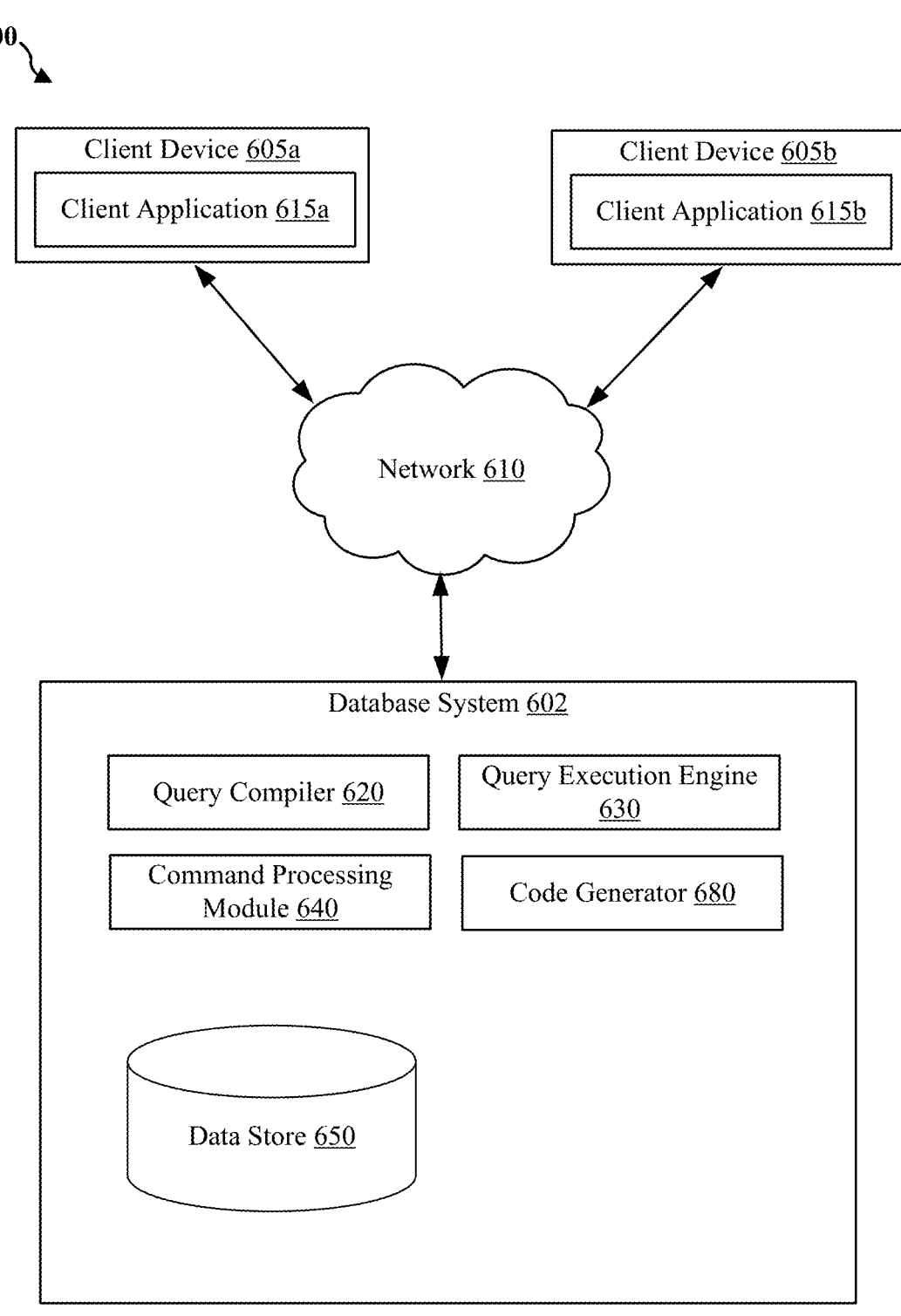
FIG. 6 illustrates an example of a computing system including a database system for querying partitions, in accordance with aspects described herein.

FIG. 6 illustrates an example of a computing system 600 including a database system 602, in accordance with an aspect of the disclosure. The database system 602 has multiple architectural components including a query compiler 620, a query execution engine 630, a command processing module 640, and/or a data store 650. The database system 602 can be similar to, or the same as, database system 502 in FIG. 5 and can be used for querying partitioned data tuples.

The query compiler 620 receives queries from client devices 605a or 605b, or client applications 615a or 615b executing thereon (e.g., via one or more processors or memories of the client devices 605a or 605b) and generates execution plans for the received queries. Users and applications can issue queries. For a particular query, the query compiler 620 compiles the query to generate an execution plan for execution of the query and may perform one or more optimizations (e.g., separately on separate collections of tuples, such as on partitioned tuples and exception set tuples, as described). An execution plan includes an ordered set of steps used to access data in the database system 602. The execution plan can include a complete set of physical operators for executing the database query and relationships between the physical operators. A physical operator produces an output data set from one or more input data sets. Hash join, sort merge join, index scan, or transliterate are some example physical operators. The query compiler 620 provides the execution plans to the query execution engine 630 for execution.

The query compiler 620 can determine whether to identify separate collections of tuples as one collection corresponding to a partition based on multiple partition keys and one collection that includes exceptions to the partitions based on the partition keys, when generating an execution plan for a query, at least where the query is for retrieving data. In this regard, the query compiler 620 may optimize at least the collection of tuples in the partition or may separately optimize the set of exception tuples.

A code generator 680 can receive an execution plan and can translate the execution plan into sequences of query steps specified using executable code. The query execution engine 630 can generate and execute the generated executable code. The query execution engine 630 can implement the physical operators included in the execution plan.

The command processing module 640 can receive commands and can process the commands. Commands are instructions that are used to communicate with the database system 602 to perform specific tasks (e.g., administrative tasks) for configuring the database system 602. The commands may be received from client devices 605 and/or the query compiler 620. Create table, delete table, and alter table are some example commands. For example, to process a create table command, the command processing module 640 may create and store a new table in the data store 650 according to the attributes specified in the create table command.

Client devices 605 can be computing devices, including one or more processors, one or more memories, etc., that execute client software, e.g., a web browser or built-in client application or other instructions, to interact with the parallel database system 602 via a network. Note that the terms "client" or "client device," as used herein may refer to software providing respective functionality, to hardware on which the software executes, or to the entities operating the software and/or hardware, as is apparent from the context in which the terms are used. For example, a client device 605 may execute business intelligence software or analytic tools that send interactions with the database system 602.

In one aspect, the client device 605 can be a personal computer (PC), a desktop computer, a laptop computer, a notebook, a tablet PC executing an operating system, for example, a Microsoft Windows-compatible operating system (OS), Apple OS X, and/or a Linux distribution. In another aspect, the client device 605 can be any device having computer functionality, such as a personal digital assistant (PDA), mobile telephone, smartphone, etc. In an aspect, a client of the database system can be another process, for example, a web server that serves queries from remote devices.

The interactions between the client devices 605 and the database system 602 can typically be performed via a network 610, for example, via the Internet. The network 610 enables communications between the client device 605 and the database system 602. In one aspect, the network 610 uses standard communications technologies and/or protocols. In another aspect, the entities can use custom and/or dedicated data communications technologies instead of, or in addition to, the ones described above. Depending upon the variation, the network 610 can also include links to other networks such as the Internet. In addition, for example, portions of the database system 602 may be remotely located from one another, and may communicate over the network 610, Internet, etc. In an example, as described, data can be stored in multiple data stores 650, partitions, etc. distributed over a network 610, such as in a cloud-computing environment.

FIG. 7 is a flowchart of an example of a method 700 of database operation for partitioning data tuples using multiple partition keys. The method 700 may be performed by one or more components of the database system 502 or 602, such as a data partitioner 520, query compiler 620, query execution engine 630, command processing module 640, etc.

At block 702, the method 700 may include assigning multiple data tuples to multiple partitions such that each partition of the multiple partitions includes a portion of the multiple data tuples having same values for at least one of the multiple partition keys. For example, one or more components of the database system 502, such as data partitioner 520, in conjunction with one or more processors, a memory storing instructions for executing on a processor and/or related data, etc., may assign the multiple data tuples to multiple partitions such that each partition of the multiple partitions includes a portion of the multiple data tuples having same values for at least one of the multiple partition keys. For example, data partitioner 520 can assign the multiple data tuples to the multiple partitions based on performing a patched multi-key partitioning, as described herein, which may be based on relaxing the multi-key partitioning definition to allow exceptions to the partitioning, as described above. In addition, data partitioner 520 can assign the multiple data tuples to the multiple partitions by indicating a partition identifier in the data tuple or corresponding metadata, by writing the data tuple to a partition corresponding to the partition identifier, and/or the like. In method 700, for example, assigning the multiple data tuples to the multiple partitions may be performed using a graph partitioning algorithm.

At block 704, the method 700 may include generating a set of exception data tuples including an exception portion of the multiple data tuples having a first value of at least one of the multiple partition keys that is the same as the same value of a first portion of data tuples assigned to a first one of the multiple partitions and a second value of at least a second one of the multiple partition keys that is the same as the same value of a second portion of data tuples assigned to a second one of the multiple partitions. For example, one or more components of the database system 502, such as data partitioner 520, in conjunction with one or more processors, a memory storing instructions for executing on a processor and/or related data, etc., may generate the set of exception data tuples (e.g., exception set 540) including the exception portion of the multiple data tuples having the first value of at least one of the multiple partition keys that is the same as the same value of the first portion of data tuples assigned to the first one of the multiple partitions and the second value of at least the second one of the multiple partition keys that is the same as the same value of a second portion of data tuples assigned to the second one of the multiple partitions. In this regard, for example, the exception set 540 can include data tuples that do not satisfy all of the multiple partition key constraints, and thus could potentially be associated with multiple different partitions.

At block 706, the method 700 may optionally include executing a query on at least a portion of the multiple partitions, and at block 708, separately executing a query on the set of exception data tuples. For example, one or more components of the database system 602, such as query execution engine 630, in conjunction with one or more processors, a memory storing instructions for executing on a processor and/or related data, etc., may execute a query on at least a portion of the multiple partitions, and separately execute a query (e.g., the same query) on the set of exception data tuples (e.g., exception set 540). In one example, data partitioner 520 may repartition the set of exception data tuples to one of the multiple partitions for the purposes of performing the query. For example, data partitioner 520 may select one of the multiple partitions to which the data tuples in the exception set 540 may belong based on a partition key value, and may assign the data tuples to an associated partition. For example, query execution engine 630 can perform querying over the partitioned data tuples and/or the exception set 540 as described in reference to FIG. 4 above.

In assigning the multiple data tuples to the multiple partitions at block 702, optionally at block 710, each portion of the multiple data tuples having a same value for at least one of the multiple partition keys can be assigned to a same partition of the multiple partitions. For example, one or more components of the database system 502, such as data partitioner 520, in conjunction with one or more processors, a memory storing instructions for executing on a processor and/or related data, etc., may assign each portion of the multiple data tuples having the same value for at least one of the multiple partition keys to the same partition of the multiple partitions. However, if the data tuple also has a same value of a second partition key that is the same as a value for a data tuple assigned to a different partition, data partitioner 520 can consider this data tuple an exception and can assign the data tuple to the exception set 540. In other examples, generating partitions and the exception set 540 can be accomplished using a graph partitioning algorithm. As described, an input table of data to be input into the database system 502 or 602, or data that is already existing in the database system 502 or 602 and is ready for partitioning, can be mapped to a graph based on the partition keys.

For example, in assigning the multiple data tuples to the multiple partitions at block 702, optionally at block 712, the multiple data tuples can be transformed into an undirected graph based on the values for the multiple partition keys, and the multiple data tuples can be assigned to the multiple partitions based on performing a graph partition algorithm to generate a graph partitioning. For example, one or more components of the database system 502, such as graph partitioner 532, in conjunction with one or more processors, a memory storing instructions for executing on a processor and/or related data, etc., may transform the multiple data tuples into the undirected graph based on the values for the multiple partition keys, and may assign the multiple data tuples to the multiple partitions based on performing the graph partition algorithm to generate the graph partitioning. For example, graph partitioner 532 can use a vertex graph partition algorithm that assigns the tuples to vertices of the graph or an edge graph partition algorithm that assigns the tuples to edges of the graph, as shown and described with reference to FIG. 1 (e.g., $G_{t\_as\_v}$ or $G_{t\_as\_e}$). In this regard, for example, a graph $G_{t\_as\_v}(R)$ can include a vertex for each distinct combination of partition key values of R and an edge between two vertices for each shared partition key value. On the other hand, $G_{t\_as\_e}(R)$ can be a multipartite graph and can include a vertex for each distinct partition key value and an edge between two vertices for each tuple in R which contains the respective partition key values.

In this example, in generating the set of exceptions at block 704, optionally at block 714, a portion of the vertices can be cut from the graph, and the set of exceptions can be generated based on the cut vertices, or optionally at block 716, a portion of the edges can be cut from the graph, and the set of exceptions can be generated based on the cut edges, which can depend on whether the graph partition algorithm used is the vertex graph partition algorithm or the edge graph partition algorithm. For example, one or more components of the database system 502, such as graph partitioner 532, in conjunction with one or more processors, a memory storing instructions for executing on a processor and/or related data, etc., may cut the portion of the vertices from the graph, and generate the set of exceptions based on the cut vertices, or may cut the portion of the edges from the graph, and generate the set of exceptions based on the cut edges.

At block 718, the method 700 may optionally include storing, in a column of each data tuple of the multiple data tuples, a stored partition identifier including one of a valid partition identifier of the one of the multiple partitions to which each of the multiple data tuples that is not in the set of exceptions is assigned, or an invalid partition identifier for each data tuple in the set of exceptions. For example, one or more components of the database system 502, such as data partitioner 520, in conjunction with one or more processors, a memory storing instructions for executing on a processor and/or related data, etc., may store, in the column of each data tuple of the multiple data tuples (e.g., or in other metadata), the stored partition identifier including one of the valid partition identifier of the one of the multiple partitions to which each of the multiple data tuples that is not in the set of exceptions is assigned, or an invalid partition identifier for each data tuple in the set of exceptions (e.g., exception set 540, or the data tuples corresponding to the cut vertices or edges). For example, data partitioner 520 can store the partition identifiers as part of mapping graph partitions back to table partitions, as described above (e.g., with reference to FIG. 2). In one example, data partitioner 520 may additionally or alternatively move the data tuples to the corresponding partitions (e.g., based on the stored partition identifier, at least for the valid partition identifiers). This can facilitate independent querying of the data tuples in (or based on) partitions and of the exception data tuples.

FIG. 8 is a flowchart of an example of a method 800 of database operation for iteratively partitioning data tuples using multiple partition keys. The method 800 may be performed by one or more components of the database system 502 or 602, such as a data partitioner 520, query compiler 620, query execution engine 630, command processing module 640, etc.

At block 702, the method 800 may include assigning multiple data tuples to multiple partitions such that each partition of the multiple partitions includes a portion of the multiple data tuples having same values for at least one of the multiple partition keys, as described with reference to FIG. 7 above.

At block 704, the method 800 may include generating a set of exception data tuples including an exception portion of the multiple data tuples having a first value of at least one of the multiple partition keys that is the same as the same value of a first portion of data tuples assigned to a first one of the multiple partitions and a second value of at least a second one of the multiple partition keys that is the same as the same value of a second portion of data tuples assigned to a second one of the multiple partitions, as described with reference to FIG. 7 above.

At block 706, the method 800 may optionally include executing a query on at least a portion of the multiple partitions, and at block 708, separately executing a query on the set of exception data tuples, as described with reference to FIG. 7 above.

In assigning the multiple data tuples to the multiple partitions at block 702, optionally at block 802, for each data tuple in the multiple data tuples, the data tuple can be assigned to a partition of the multiple partitions based on the data tuple having the same value for at least one of the multiple partition keys as one or more other data tuples assigned to the partition, or the data tuple can be assigned to a new partition of the multiple partitions based on the data tuple not having the same value for any of the multiple partition keys as data tuples stored on the multiple partitions. For example, one or more components of the database system 502, such as iterative partitioner 534, in conjunction with one or more processors, a memory storing instructions for executing on a processor and/or related data, etc., may, for example data tuple in the multiple data tuples, assign the data tuple to the partition of the multiple partitions based on the data tuple having the same value for at least one of the multiple partition keys as one or more other data tuples assigned to the partition, or assign the data tuple to the new partition of the multiple partitions based on the data tuple not having the same value for any of the multiple partition keys as data tuples stored on the multiple partitions. For example, as described, if the data tuple has a partition key value that matches values of data tuples in other partitions, it can be assigned to the exception set in block 704. This can be similar to the process described with reference to FIG. 3 above.

Figure 9:
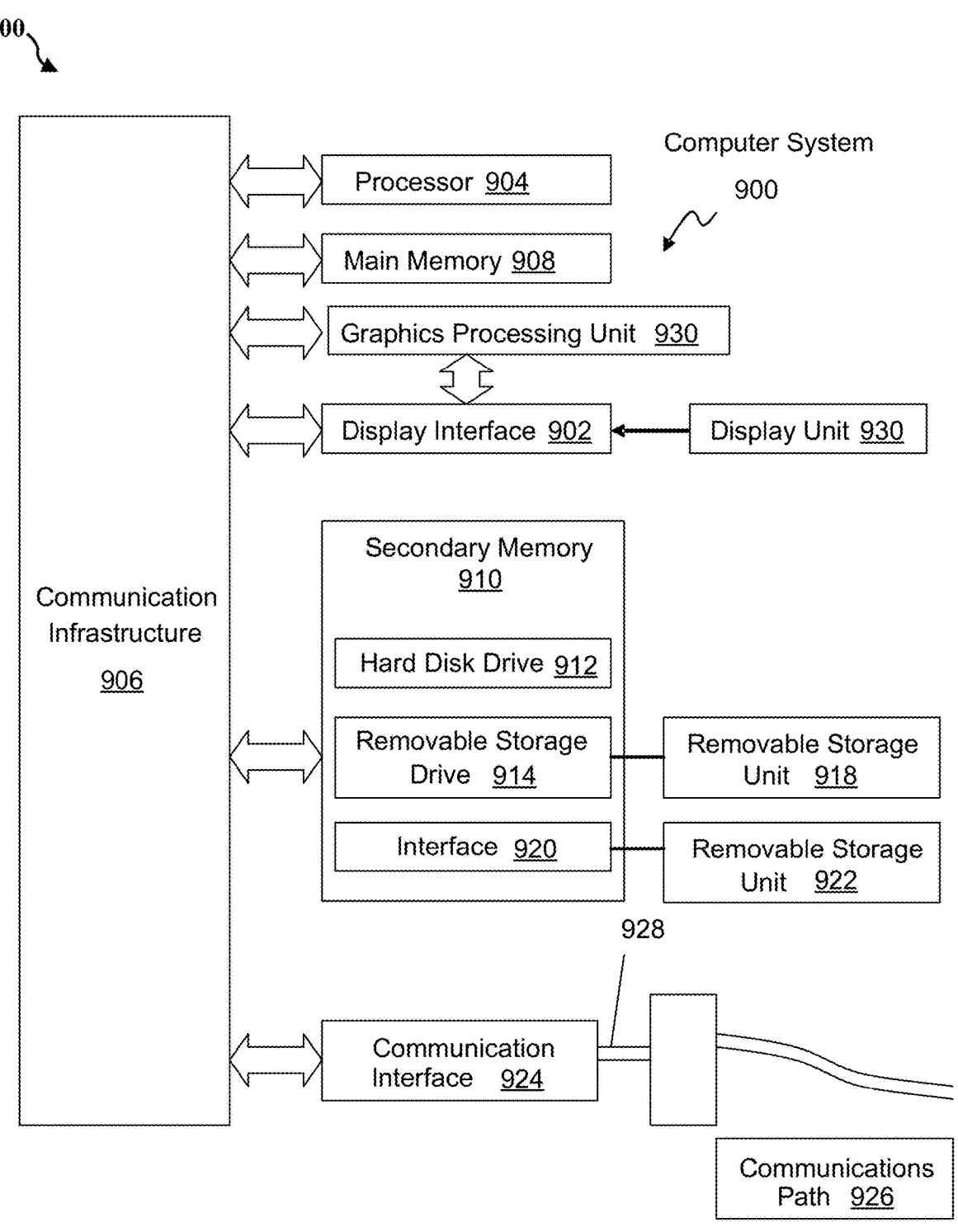
FIG. 9 presents an example system diagram of various hardware components and other features, for use in accordance with aspects of the present disclosure.

FIG. 9 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 900 is shown in FIG. 9.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include nonvolatile memory, for example, a hard disk drive 912, flash memory and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a USB memory drive, SD card, floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 914, a hard disk installed in hard disk drive 912, and signals 928. These computer program products provide software to the computer system 900. Aspects of the disclosure are directed to such computer program products.

Computer programs (also referred to as computer control logic) are stored in main memory 908 and/or secondary memory 910. Computer programs may also be received via communications interface 924. Such computer programs, when executed, enable the computer system 900 to perform various features in accordance with aspects of the present disclosure, as discussed herein. In particular, the computer programs, when executed, enable the processor 904 to perform such features. Accordingly, such computer programs represent controllers of the computer system 900.

In variations where aspects of the disclosure are implemented using software, the software may be stored in a computer program product and loaded into computer system 900 using removable storage drive 914, hard disk drive 912, or communications interface 920. The control logic (software), when executed by the processor 904, causes the processor 904 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 10:
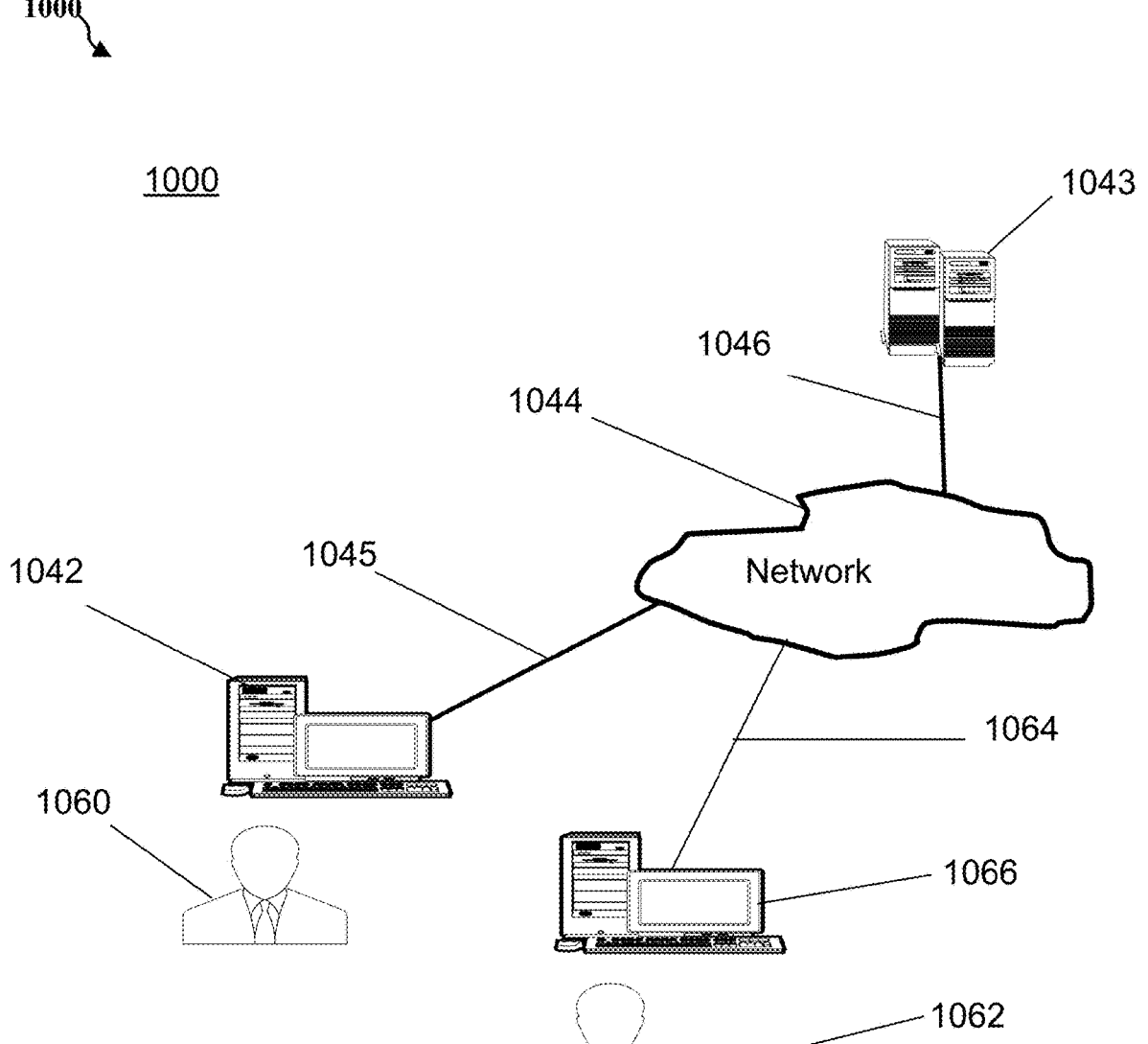
FIG. 10 is a block diagram of various example system components, for use in accordance with aspects of the present disclosure.

FIG. 10 is a block diagram of various example system components (e.g., on a network) that may be used in accordance with aspects of the present disclosure. The system 1000 may include one or more accessors 1060, 1062 (also referred to interchangeably herein as one or more "users") and one or more terminals 1042, 1066. In one aspect, data for use in accordance with aspects of the present disclosure may, for example, be input and/or accessed by accessors 1060, 1062 via terminals 1042, 1066, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiber optic links. In another example variation, the method and system in accordance with aspects of the present disclosure operate in a stand-alone environment, such as on a single terminal.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The foregoing description, for purpose of explanation, has been with reference to specific aspects. However, the illustrative discussions above are not intended to be exhaustive or to limit the disclosure to the precise forms disclosed. Many modifications and variations are possible in view of the above teachings. The aspects were chosen and described in order to best explain the principles of the disclosure and its practical applications, to thereby enable others skilled in the art to best utilize the disclosure and various aspects with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present disclosure, for example, aspects of the innovations herein may be implemented consistent with numerous general purpose or special purpose computing systems or configurations. Various example computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The disclosure may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the disclosure or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the disclosure have been specifically described herein, it will be apparent to those skilled in the art to which the disclosure pertains that variations and modifications of the various implementations shown and described herein may be made without departing from the spirit and scope of the disclosure. Accordingly, it is intended that the disclosure be limited only to the extent required by the applicable rules of law.

While the foregoing has been with reference to a particular aspect of the disclosure, it will be appreciated by those skilled in the art that changes in this aspect may be made without departing from the principles and spirit of the disclosure, the scope of which is defined by the appended claims.

What is claimed is:

1. A computer-implemented method for partitioning multiple data tuples stored in a database system to multiple partitions based on multiple partition keys, comprising:

assigning the multiple data tuples to multiple partitions such that each partition of the multiple partitions includes a portion of the multiple data tuples having same values for at least one of the multiple partition keys;

generating a set of exception data tuples including an exception portion of the multiple data tuples based on each data tuple in the exception portion of the multiple data tuples having:

a first value of at least a first one of the multiple partition keys that is the same as the same value of a first portion of data tuples assigned to a first one of the multiple partitions; and a second value of at least a second one of the multiple partition keys that is the same as the same value of a second portion of data tuples assigned to a second one of the multiple partitions;

executing a query on at least a portion of the multiple partitions; and separately executing the query on the set of exception data tuples.

2. The computer-implemented method of claim 1, wherein assigning the multiple data tuples to the multiple partitions includes assigning each portion of the multiple data tuples having same values for at least one of the multiple partition keys to a same partition of the multiple partitions.

3. The computer-implemented method of claim 2, further comprising transforming the multiple data tuples into an undirected graph based on the values for the multiple partition keys, wherein assigning the multiple data tuples to the multiple partitions is based on performing a graph partition algorithm to generate a graph partition.

4. The computer-implemented method of claim 3, wherein the graph partition algorithm is a vertex-cut algorithm to assign edges to partitions and cut a portion of vertices from the graph, and wherein generating the set of exceptions is based on the vertices that are cut from the graph.

5. The computer-implemented method of claim 3, wherein the graph partition algorithm is an edge-cut algorithm to assign vertices to partitions and cut a portion of edges from the graph, and wherein generating the set of exceptions is based on the edges that are cut from the graph.

6. The computer-implemented method of claim 3, further comprising storing, in a column of each data tuple in the multiple data tuples, a stored partition identifier including one of:

a valid partition identifier of the one of the multiple partitions to which each of the multiple data tuples that is not in the set of exceptions is assigned; or an invalid partition identifier for each data tuple in the set of exceptions.

7. The computer-implemented method of claim 1, wherein assigning the multiple data tuples to the multiple partitions includes, for each data tuple in the multiple data tuples, one of:

assigning the data tuple a partition of the multiple partitions based on the data tuple having the same value for at least one of the multiple partition keys as one or more other data tuples assigned to the partition; or assigning the data tuple to a new partition of the multiple partitions based on the data tuple not having the same value for any of the multiple partition keys as data tuples stored on the multiple partitions.

8. The computer-implemented method of claim 1, wherein separately executing the query on the set of exception data tuples includes repartitioning the set of exception data tuples to one of the multiple partitions.

9. A system for partitioning multiple data tuples stored in a database system to multiple partitions based on multiple partition keys, comprising:

one or more memories configured to store instructions; and one or more processors communicatively coupled with the one or more memories, wherein the one or more processors are configured to:

assign the multiple data tuples to multiple partitions such that each partition of the multiple partitions includes a portion of the multiple data tuples having same values for at least one of the multiple partition keys; and generate a set of exception data tuples including an exception portion of the multiple data tuples based on each data tuple in the exception portion of the multiple data tuples having:

a first value of at least a first one of the multiple partition keys that is the same as the same value of a first portion of data tuples assigned to a first one of the multiple partitions; and a second value of at least a second one of the multiple partition keys that is the same as the same value of a second portion of data tuples assigned to a second one of the multiple partitions;

execute a query on at least a portion of the multiple partitions; and separately execute the query on the set of exception data tuples.

10. The system of claim 9, wherein the one or more processors are configured to assign the multiple data tuples to the multiple partitions at least in part by assigning each portion of the multiple data tuples having same values for at least one of the multiple partition keys to a same partition of the multiple partitions.

11. The system of claim 10, wherein the one or more processors are configured to transform the multiple data tuples into an undirected graph based on the values for the multiple partition keys, wherein the one or more processors are configured to assign the multiple data tuples to the multiple partitions based on performing a graph partition algorithm to generate a graph partition.

12. The system of claim 11, wherein the graph partition algorithm is a vertex-cut algorithm to assign edges to partitions and cut a portion of vertices from the graph, and wherein the one or more processors are configured to generate the set of exceptions based on the vertices that are cut from the graph.

13. The system of claim 11, wherein the graph partition algorithm is an edge-cut algorithm to assign vertices to partitions and cut a portion of edges from the graph, and wherein the one or more processors are configured to generate the set of exceptions based on the edges that are cut from the graph.

14. The system of claim 11, wherein the one or more processors are configured to store, in a column of each data tuple in the multiple data tuples, a stored partition identifier including one of:

a valid partition identifier of the one of the multiple partitions to which each of the multiple data tuples that is not in the set of exceptions is assigned; or an invalid partition identifier for each data tuple in the set of exceptions.

15. The system of claim 9, wherein the one or more processors are configured to assign the multiple data tuples to the multiple partitions including, for each data tuple in the multiple data tuples, one of:

assigning the data tuple a partition of the multiple partitions based on the data tuple having the same value for at least one of the multiple partition keys as one or more other data tuples assigned to the partition; or assigning the data tuple to a new partition of the multiple partitions based on the data tuple not having the same value for any of the multiple partition keys as data tuples stored on the multiple partitions.

16. The system of claim 9, wherein the one or more processors are configured to separately execute the query on the set of exception data tuples including repartitioning the set of exception data tuples to one of the multiple partitions.

17. A non-transitory computer-readable medium comprising code executable by one or more processors for partitioning multiple data tuples stored in a database system to multiple partitions based on multiple partition keys, the code comprising code for:

assigning the multiple data tuples to multiple partitions such that each partition of the multiple partitions includes a portion of the multiple data tuples having same values for at least one of the multiple partition keys; and generating a set of exception data tuples including an exception portion of the multiple data tuples based on each data tuple in the exception portion of the multiple data tuples having:

a first value of at least a first one of the multiple partition keys that is the same as the same value of a first portion of data tuples assigned to a first one of the multiple partitions; and a second value of at least a second one of the multiple partition keys that is the same as the same value of a second portion of data tuples assigned to a second one of the multiple partitions;

executing a query on at least a portion of the multiple partitions; and separately executing the query on the set of exception data tuples.

18. The non-transitory computer-readable medium of claim 17, wherein assigning the multiple data tuples to the multiple partitions includes assigning each portion of the multiple data tuples having same values for at least one of the multiple partition keys to a same partition of the multiple partitions.

19. The non-transitory computer-readable medium of claim 17, the code comprising code for transforming the multiple data tuples into an undirected graph based on the values for the multiple partition keys, wherein assigning the multiple data tuples to the multiple partitions is based on performing a graph partition algorithm to generate a graph partition.

20. The non-transitory computer-readable medium of claim 17, wherein assigning the multiple data tuples to the multiple partitions includes, for each data tuple in the multiple data tuples, one of:

assigning the data tuple a partition of the multiple partitions based on the data tuple having the same value for at least one of the multiple partition keys as one or more other data tuples assigned to the partition; or assigning the data tuple to a new partition of the multiple partitions based on the data tuple not having the same value for any of the multiple partition keys as data tuples stored on the multiple partitions.

* * * * *